(12) United States Patent
Limcaco

(10) Patent No.: US 7,850,848 B2
(45) Date of Patent: Dec. 14, 2010

(54) APPARATUS AND PROCESS FOR BIOLOGICAL WASTEWATER TREATMENT

(76) Inventor: Christopher A. Limcaco, 3632 Chancellor Dr., Greenwood, IN (US) 46143

( * ) Notice: Subject to any disclaimer, the term of this patent is extended or adjusted under 35 U.S.C. 154(b) by 78 days.

(21) Appl. No.: 12/415,301

(22) Filed: Mar. 31, 2009

(65) Prior Publication Data

US 2009/0230040 A1 Sep. 17, 2009

Related U.S. Application Data

(63) Continuation-in-part of application No. 11/957,648, filed on Dec. 17, 2007, now Pat. No. 7,736,508, which is a continuation-in-part of application No. 11/856,175, filed on Sep. 17, 2007, now Pat. No. 7,776,211.

(60) Provisional application No. 60/845,490, filed on Sep. 18, 2006.

(51) Int. Cl.
*C02F 3/32* (2006.01)

(52) U.S. Cl. ............... 210/602; 210/631; 210/150; 210/170.08; 210/202; 210/259

(58) Field of Classification Search ............... 210/602, 210/252, 259, 150, 151, 170.01, 170.08, 210/198.1, 202, 221.1, 221.2, 631
See application file for complete search history.

(56) References Cited

U.S. PATENT DOCUMENTS 3,598,726 A * 8/1971 Welch ............... 210/602

| | | |
|---|---|---|
| 4,267,038 A | 5/1981 | Thompson |
| 4,874,225 A | 10/1989 | Pruszenski, Jr. |
| 5,647,983 A | 7/1997 | Limcaco |
| 5,755,961 A | 5/1998 | Limcaco |
| 6,158,386 A | 12/2000 | Limcaco |
| 6,477,841 B1 | 11/2002 | Yantovsky |
| 2005/0269259 A1 | 12/2005 | Dunlop et al. |

FOREIGN PATENT DOCUMENTS

WO 9524548 A1 9/1995

* cited by examiner

*Primary Examiner*—Fred Prince
(74) *Attorney, Agent, or Firm*—Maginot, Moore & Beck LLP

(57) ABSTRACT

A self-sustaining wastewater treatment facility abates greenhouse gas abatement, captures $CO_2$ and produces biomass to address multiple critical environmental needs. The facility includes an array of rotating media wheels that create an optimum ordered mixing of algae for sustained growth. Biomass harvested from the rotating media wheels may be provided to other processing facilities to produce, for instance, bio-fuels. Waste $CO_2$ from the processing facility may also be returned to the treatment system for enhanced algae growth. Bacteria are provided to form a symbiotic relationship with the algae, fueled by sunlight to effectively remove toxic materials from the wastewater. The multi-functional facility may also be integrated into a regenerative facility in which the biomass obtained from the algal and bacterial colonies is used in a separate facility and byproducts of the operation of the separate facility are used by the multi-functional facility to fuel further algal growth.

17 Claims, 10 Drawing Sheets

PROCESS FLOW SCHEMATIC

FIG. 1 – PROCESS FLOW SCHEMATIC

FIG. 2 - HYDRAULIC FLOW DIAGRAM - PROCESS FLOW

APPARATUS AND PROCESS FOR BIOLOGICAL WASTEWATER TREATMENT

REFERENCE TO RELATED APPLICATION

This application is a continuation-in-part of and claims priority to application Ser. No. 11/957,648, filed on Dec. 17, 2007, entitled "System and Method for Biological Wastewater Treatment and Using the Byproduct Thereof" and now issued as U.S. Pat. No. 7,736,508, which is a continuation-in-part of and claims priority to application Ser. No. 11/856,175, filed on Sep. 17, 2007, and now issued as U.S. Pat. No. 7,776,211, which claims priority to provisional patent application No. 60/845,490, filed on Sep. 18, 2006.

BACKGROUND

The present invention provides a multi-functional apparatus and process for biological wastewater treatment. The present invention addresses multiple critical environmental needs, including energy efficient treatment of wastewater, abatement of greenhouse gases (GHGs) produced from conventional wastewater treatment processes, $CO_2$ capture from $CO_2$ generators, and biomass production for renewable energy, fertilizer, feed additive, bio-plastics, cosmetics, pharmaceuticals, fabrics, bio-fuels, and other uses.

Wastewater treatment has grown significantly from its origins for treatment of metropolitan sewage. Environmental protection regulations require treatment of effluent from wastewater generators prior to drainage into a common waterway. Treatment processes now exist to meet these regulations, but the methods create significant GHGs, and are complex, expensive and energy intensive. Bacteria-based treatment processes were developed when energy costs were low and there were no concerns about climate change. Obviously, that is not the case today. Two major problems with current wastewater treatment technologies are their large energy consumption and large carbon footprint. According to the U.S. EPA., wastewater treatment plants (WWTPs) account for 3% of the entire U.S. electrical demand and generate 3.4% of all GHG emissions in the U.S.

The two most widely used processes for wastewater treatment are the activated sludge and bio-film systems. There are over 16,000 WWTPs in operation in the U.S. Of these, 6,800 are activated sludge municipal wastewater treatment plants which require 1.3-2.5 MWh per every million gallons (MG) treated. There are over 2,500 municipal bio-film systems in the U.S. which require 0.8-1.8 MWh per MG. In addition to activated sludge and bio-film systems, there are over 5,100 pond type wastewater treatment systems in the U.S. The energy requirement for pond systems is typically lower at 0.4-1.4 MWh per MG but these types of systems are not capable of meeting current direct discharge regulatory requirements. Pond systems also require large amounts of land and have large carbon footprints because they generate methane from anaerobic digestion in the bottom of the ponds. For this reason, some regulatory agencies will no longer allow these types of systems at all. Regulatory agencies will soon also require nitrogen and phosphorous removal at most municipal WWTPs. Nitrogen and phosphorous removal is very difficult to achieve with an activated sludge or bio-film system and would add significantly to the capital cost of WWTPs as well as increase their energy consumption and GHG emissions.

Conventional wastewater treatment involves three process stages, called primary, secondary and tertiary treatment, followed by sludge processing. In the primary stage, paper, plastics, and large solid objects are separated from the wastewater stream by coarse or fine mechanically or manually cleaned screens. Additional solids, grease, and scum are removed utilizing primary clarifiers or mechanical filters designed to replace primary clarifiers.

In the conventional secondary stage, organic material is digested using indigenous, water-borne and predominantly non-phototrophic bacteria. Secondary treatment systems are generally classified as either bio-film or suspended growth. Bio-film treatment processes include trickling filters and rotating biological contactors (RBCs) where the biomass grows on media and the sewage passes over its surface. Bio-film systems are not capable of efficiently growing algae or phototrophic bacteria because of mechanical problems and clogging. RBCs are typically covered to prevent exposure to sunlight with trickling filters that are generally vertical in geometry with a very small surface area exposed to sunlight. In suspended growth systems—such as activated sludge and membrane bioreactors (MBRs)—the biomass is well mixed with the sewage and can be operated in a smaller space than bio-film systems that treat the same amount of water. However, like the bio-film systems, suspended growth systems are not capable of growing algae or phototrophic bacteria due to the high concentration of bacteria maintained in the system, typically referred to as mixed liquor suspended solids (MLSS) concentration.

In a conventional WWTP, ammonia is converted to nitrates through another bacteria based process called nitrification. This process can be performed in a "separate stage nitrification" process or combined with the secondary treatment process. The treated water is finally disinfected using chlorination or UV disinfection prior to discharge to a body of water.

The sludge generated from the wastewater processes is accumulated in sludge processing tanks where it is broken down or digested by aerobic or anaerobic processes. After digestion, the sludge is dewatered, dried, and hauled to a landfill or land applied. The sludge handling at conventional WWTPs is extremely energy intensive, requires chemicals for dewatering and sludge stabilization, and uses fossil fuels to process and transport the sludge for final disposal. The sludge, regardless of whether it is taken to a landfill or land applied, is converted by bacteria to greenhouse gases. Sludge that is land applied also creates public health hazards from fecal and pharmaceutical contamination of food crops. Several states and nations are moving towards banning the practice of land applying human feces altogether.

A second critical environmental need is the reduction of the carbon footprint associated with conventional wastewater treatment processes and the capturing of $CO_2$ from $CO_2$ generators. All conventional biological wastewater treatment and sludge digestion processes convert the organic and inorganic components in the wastewater to greenhouse gases. Conventional WWTPs simply convert one form of pollution into another—solid to gas. The conventional secondary treatment process creates $CO_2$ gas from bacterial respiration. The conventional tertiary stage process creates nitrous oxide ($N_2O$) from the nitrification process, a GHG that is 310 times more potent than $CO_2$ (Kyoto protocol). The sludge digestion processes creates methane ($CH_4$), a GHG that is 21 times more potent than $CO_2$ (Kyoto protocol).

Current ideas for carbon sequestration include pumping carbon dioxide underground and capture in algae systems. The main problem with pumping $CO_2$ underground is that the energy requirements make this approach impractical to implement. Another problem is the risk that the gases will escape to the surface. There have been documented cases where naturally occurring $CO_2$ gases escaped from underground to the surface of the earth killing all of the humans and animals in the surrounding area. Pumping $CO_2$ underground is the equivalent to dumping our wastes into the ocean. We have no idea what the future consequences of such actions would cause.

Carbon sequestration via algae based systems is also impractical. The most efficient algae production rates from various algae production technologies currently being tested range from 50-100 dry tons of algae per acre per year. It is known that algae is approximately 50% carbon and uses approximately 1.9 lbs of $CO_2$ for every 1.0 lb of algae produced. It is also known that 1.0 lb of coal typically creates approximately 2.7 lbs of $CO_2$. Therefore, it can be calculated that 1.42 lbs of algae is required to sequester the $CO_2$ generated from the combustion of 1.0 lbs of coal. Using the highest algae production rate indicated above, it can also be calculated that a 1.0 acre algae production system could sequester the $CO_2$ generated from 70.4 tons of coal per year. According to the U.S. Energy Information Administration, the U.S. currently consumes 1,129 million tons of coal per year. In order to sequester the $CO_2$ generated from this coal, 1,603 million tons of algae would be required which translates to 16 million acres or 25,000 square miles of land, or roughly the entire state of Virginia.

Another critical environmental need is to provide a cost effective and reliable biomass production system. The biomass produced from the system can be used as a feedstock for renewable energy production, fertilizer, and other useful products. The need for a renewable energy source has become particularly acute and the subject of widespread concern. For example, fossil-fuel based energy (gas and oil) are known to be finite. While the debate rages as to exactly how finite is "finite", much evidence suggests that worldwide oil production will peak in around 2010, and that the oil supply will end as early as 2035 but no later than 2060. Nevertheless, there is no question that the fossil fuels will be depleted.

Awareness of the limited life of fossil fuels has prompted significant research and development for renewable energy sources. Much research has been devoted to alternative energy sources, such as solar, wind and biomass. However, these alternative energy sources cannot cost effectively and reliably produce electricity and do not appear to have the near-term capability of satisfying the need for petroleum-type fuels—i.e., gasoline and diesel fuels. Research in the 1980s focused on developing gasoline and diesel fuels based on renewable resources, such as corn-based ethanol and bio-diesel. Most bio-diesels are based on food crops, such as soybeans, which require a significant amount of energy to grow and harvest. Moreover, the food crops themselves must be devoted to the production of biofuels.

Research conducted from 1980-1996 by the U.S. Department of Energy established algae as a source of biofuels. Biofuel can be produced from algae by digestion for methane or hydrogen fuels, lipid extraction for bio-diesel, and distillation for ethanol. In addition to its benefits as a precursor to biofuels, algae has been developed for other uses, such as an organic fertilizer which could be used as a replacement to fertilizers produced from natural gas.

Biodiesel has been investigated by the U.S. Department of Energy (DOE) as part of its "Aquatic Species Program" that began in 1978. Funding for this program was eliminated in 1995, but growing concerns over non-renewable fossil fuels has prompted the DOE to reopen the program due to the growing interest in this seemingly infinite and renewable source for biofuels. The DOE's approach has been to create algae ponds or "raceways" near factories that generate waste $CO_2$. The waste $CO_2$ and other nutrients are injected into water circulating around a racetrack shaped pond. Algae growing in the circulating water feeds on the $CO_2$. The algae are eventually diverted from the pond for further processing as a biofuel. Thus, the DOE focus has been on artificially creating a growing environment for algae by recycling waste $CO_2$ from a factory or a coal-fired power plant. Of course, one significant limitation of this technology is that it is tied to a source of waste $CO_2$. Another detriment is that this proposed technology requires a large raceway pond, and ultimately a large amount of dedicated land in order to support enough algae to accept the waste $CO_2$ and to produce a meaningful amount of algae for biofuel production. Since the algae require exposure to sunlight for growth, the ponds must be shallow, which means that the surface area of the pond must be very large to support the algae colonies. The large size of the pond also means that the useful "season" is limited in certain locales and climates due to freezing of the pond.

There currently are no algae production systems in the world that can replace a conventional extended aeration system and achieve the same level of treatment. Some algae production systems have been proposed on WWTP effluent but that provides little benefit to the treatment plant owner because the wastewater has already been cleaned. In fact, it creates a major liability and risk to the owner because of the potential re-contamination with algae solids with certain types of algae production systems. High rate algae ponds have been used for wastewater treatment but pond systems are not capable of meeting current regulatory discharge requirements and require very large amounts of land as compared to mechanical WWTPs. One reason why current algal production systems cannot be used to treat wastewater is due to the fact that algae cannot use organic carbon as a carbon source. Carbon in wastewater as it enters the WWTP is in the form of organic carbon which is essentially useless to the algae at that point. The organic carbon must first be converted to $CO_2$ by bacteria through respiration. Current algae production systems lack a bio-media component to provide the growing means for the bacteria required for this conversion to take place. Another problem with growing algae in any kind of pond is that only in the top ¼ inch or so of the water does the algae receive enough solar radiation. Thus, the ability of the pond to grow algae is limited by its surface area, not by its volume.

Algae produces oxygen necessary for aerobic bacterial growth and bacteria produces $CO_2$ needed for algal growth. The only external input to fuel this symbiotic relationship is sunlight. This strategy was first successfully implemented in open lagoons and wetland treatment facilities. These systems had obvious limitations, such as land space, geography and topography, water clarity, etc. In addition, the lagoon systems were prone to algae blooms that would overrun and clog the systems. These limitations led to the development of the algae raceway in the 1970s. The algae raceway is essentially a flume in which nutrient-rich water is allowed to course while exposed to sunlight. The resultant algal biomass is harvested by mechanical means. One significant detriment of the algae raceway is that it requires a large surface area for adequate exposure to sunlight. In addition, the raceway requires a shallow water level to function, which inherently limits the volume and flow of wastewater that can be treated by any particular raceway facility. Still another problem with ponds and raceway systems is predation by animals and insects. The larvae of some insects feed on the algae and can consume the entire crop of algae almost overnight.

Closed loop bioreactors have also been developed for algae production. Closed loop bioreactors are typically transparent plastic tubes, plastic bags, plastic sheets, resins, glass or any material that allows light to penetrate. The proposed advantage of closed loop bioreactors is that the system allows more control over the algae and growing conditions because it is not open to the environment. One of the disadvantages of closed bioreactors is that as the algae increases in the container, the uniform light distribution throughout decreases due to the light being absorbed by the algae. The outermost layer of algae in the reactor get too much light and the inner layer of algae do not have enough light. Algae also produces organic compounds that coat the closed bioreactor and slowly reduce the ability of light to penetrate the bioreactor. The bioreactor material has to be either cleaned or replaced increasing operation and replacement costs.

Currently proposed closed bioreactors cannot be used with typical exhaust blowers found at coal plants due to the water depth of the reactors which creates too high of a pressure head for the blowers to pump against. Still another problem in closed loop bioreactors is gas buildup. Since the reactors are completely closed and $CO_2$ is being compressed into the growing container, gas concentrations can build to levels that are toxic to the algae and that are detrimental to the equipment. Another problem with closed loop bioreactors is the amount of energy required to move the water through the system, especially the vertical algae growing systems. The amount of energy required to pump the water through the system exceeds the energy obtained by the algae produced. This is essentially the same problem ethanol plants have encountered by consuming more energy than energy produced. Heat buildup is another problem with closed loop bioreactors. Ultimately, closed loop bioreactors are poor substitutes for conventional wastewater treatment processes.

The present invention solves these challenges in wastewater treatment, GHG emissions reduction, and algae and biomass production.

SUMMARY OF THE INVENTION

One primary objective of the invention is to provide a multi-functional facility that can serve to treat wastewater, abate greenhouse gases from wastewater treatment, capture $CO_2$ for $CO_2$ generators, and produce a valuable biomass for energy production and other uses. A single facility is of generating revenue streams from wastewater treatment, carbon credits, and sales of biomass/biofuels. This invention provides a significant advantage over other renewable energy systems such as wind, solar, and other biomass systems because the biomass/energy produced from the system is a bi-product of the wastewater treatment process.

As a wastewater treatment system, one objective of the invention is to provide a paradigm shift in the way that wastewater treatment is viewed. The current mindset in wastewater treatment is to "use energy to treat wastewater". This invention provides the means to "use wastewater to create energy". In accordance with one feature of the invention, the wastewater treatment system centers around the production of algae biomass using a variety of aqueous nutrient sources including but not limited to agricultural, industrial, municipal, and other wastewater sources. Algae bio-solid byproducts are then provided as input for generating bio-fuels, fertilizer, and animal feed additives.

Current wastewater treatment systems use bacteria to treat wastewater. The bacteria require large amounts of oxygen to respire, digest, and breakdown the organic and inorganic compounds in the wastewater. All of the energy used to drive this process is provided by electrically powered air blowers, water pumps, and/or mechanical aerators. The present invention uses algae to provide the majority of the oxygen required for treatment through photosynthesis which significantly reduces the external energy required to provide treatment.

A further objective is to use the bacteria to consume and digest the solids in the wastewater, typically referred to as volatile solids destruction. Since the solids are a form of energy, and prior systems use energy to destroy the solids, these prior systems are essentially "using energy to destroy energy". The Water Environment Research Foundation (WERF) has stated that wastewater contains 10 times more energy than it takes to treat it. This invention not only preserves the energy viability of the wastewater, it creates additional energy through biomass production utilizing solar energy through photosynthesis by algae and phototrophic bacteria.

The quantity of biomass (sludge) generated from conventional biological wastewater treatment processes is a direct function of the organic components coming into the plant since the bacteria used in these processes are non-photosynthetic and only use organic carbon. A conventional WWTP is incapable of producing any more biomass than that which can be produced from this organic material. The conventional wastewater treatment processes are so energy intensive that the sludge generated is not capable of creating the energy to run the plant, so that it is currently impossible to achieve a self sustaining, off the grid, wastewater treatment plant. This invention, however, provides the ability to produce enough biomass to not only run the plant but also produce excess biomass to be used outside the plant. This is accomplished by utilizing solar energy through photosynthesis to grow algae and phototrophic bacteria and because the energy requirement for oxygenating the wastewater is significantly reduced by the algae.

An important feature of this invention is the ability to oxygenate wastewater in very shallow water depths due to a combination of the algae's ability to oxygenate water and the rotation of an algae media wheel into and out of the wastewater. The normal operating depth in the media wheel tanks according to certain embodiments of the invention is approximately 15-inches deep. Conventional bacteria based wastewater treatment plants on the other hand require much greater water depths to achieve the same level of oxygenation because they use air diffusers which require deep tanks for efficient oxygen transfer. For example, a typical water depth in an activated sludge aeration tank is 15 feet. This creates a large operating head on the air blowers requiring the use of energy intensive centrifugal or positive displacement air blowers. Conventional aeration tanks are also deep and create very dangerous working conditions. This invention provides a shallow operating depth which eliminates the hazardous working conditions.

In one embodiment, the input to the system is wastewater containing biological and other waste obtained from a variety of sources. The inventive system contemplates variable volumes of wastewater into the system, such as might arise in municipal, agricultural, and industrial wastewater treatment plants. In a first step in the process of the present invention, the raw wastewater is mechanically screened to remove solids such as plastics, rags, and large solid objects, which may be disposed of in a conventional manner, such as delivery to a landfill or can be added to the biomass generated.

When raw wastewater reaches a WWTP, the energy value of the organic compounds is at its highest level. Biological breakdown of the organic compounds or volatile suspended solids (VSS) by conventional treatment processes actually reduces and destroys the energy potential of the wastewater. The energy required to run the plant is also a direct function of the amount of organic compounds delivered to the treatment process. In addition, algae cannot utilize organic carbon which is the form carbon is in as it enters the WWTP. It must first be converted to $CO_2$ by bacteria through respiration. This requires additional energy. Therefore, it is advantageous to remove as much of the organic material from the wastewater before biological treatment to preserve the energy value and reduce the energy demand of the facility for treatment of the organic carbon. A conventional primary clarifier can be used to reduce biochemical oxygen demand (BOD) and total suspend solids (TSS) in raw wastewater by 30% and 70% respectively. The conventional primary clarifier process can also be improved through chemically enhanced primary treatment (CEPT). The BOD and TSS removal rates with CEPT can be increase to 57% and 85% respectively. Mechanical filtration units specifically designed to replace primary clarifiers can also be used to remove organic compounds at the head of the plant if land space is an issue.

The primary clarifier effluent then flows to the primary algae media wheels. The wastewater entering the primary media wheels is an aqueous solution of nutrients which facilitates the growth of bacteria and algae. Each media wheel has an internal bio-media designed for the growth of non-phototrophic bacteria and an external surface exposed to sunlight that supports algae and phototrophic bacteria. Thus, in accordance with one aspect of the inventive system and method, this nutrient-laden wastewater passes through the internal bio-media of the media wheels which is hospitable to varying species of bacteria able to take advantage of the appropriate environment and available nutrients. The bacteria perform a variety of biological processes which either assimilate nutrients into a biomass or convert nutrients into less environmentally toxic forms. One biological reaction facilitated by bacteria in the media wheel bio-media is:

$$(CH_2O)_x + O_2 \rightarrow CO_2 + H_2O$$

where $(CH_2O)_x$ represents the biochemical oxygen demand (BOD) of the organic substances introduced via the wastewater source.

In one embodiment, the primary media wheels include a rotating wheel construction that provides surfaces for colonization by algae and phototrophic bacteria. This rotating media wheel system facilitates the following biological reaction occurring by photosynthesis:

$$CO_2 + 2H_2O + \text{Solar Energy} \rightarrow (CH_2O)_x + O_2 + H_2O$$

where $(CH_2O)_x$ represents the organic matter fixed in the algal biomass. The inventive system capitalizes on a beneficial symbiosis between algae and bacteria which results in a cost effective method of producing biomass. The bacteria rely on the presence of $O_2$ produced by the algae and the algae rely on the $CO_2$ produced by the bacteria. The growth of bacterial and algal colonies in the primary media wheels results in a reduction of BOD (biochemical oxygen demand) from the wastewater source, as well as a reduction in suspended solids, nitrogen, phosphorous, and other nutrients. Since the algae uses solar energy in its photosynthetic uptake of nutrients; the rotating media wheel of the present system is intentionally exposed to sunlight to take advantage of this source of free energy. The net effect is an efficient environment for the production of bacterial and algal biomass found in no other system used to treat wastewater.

The effluent from the primary media wheels then travels to secondary clarifiers for the removal of the biomass generated in the primary media wheels. The effluent from the secondary clarifiers then travels to a separate stage secondary media wheel system for further wastewater treatment, GHG abatement and carbon capture, and biomass production.

The secondary media wheels may be identical to the previously described primary media wheels. However, the wastewater must be treated in two distinctly separate media wheel processes in order to achieve the desired wastewater treatment that meets regulatory requirements.

As with the primary media wheels, water exiting the secondary media wheels consequently contains a percentage of algal and bacterial solids (biomass). The biomass is then separated from the treated water using conventional tertiary clarifiers. The clarified effluent water may then be disinfected and directly discharged to a receiving stream, applied to adjacent land in accordance with regulatory requirements or re-used for other purposes.

The rotating media wheels have fins to capture air in order to rotate the media wheel and to provide increased surface area for additional algae and phototrophic bacteria growth. The overall geometry of the media wheel and fins may provide a total algae growing surface area that is over 7.6 times the two-dimensional footprint of the wheel. The media wheels are rotated by injecting air from air blowers into an orifice in an air pipe beneath each media wheel. The use of injected air to drive the rotating media wheels eliminates the need for mechanical drive mechanisms which have the potential to fail as biomass accumulates on the surface of the rotating media wheel. The rotational speed of the media wheels is regulated depending on the depth of water in each media wheel compartment. In particular, the rotational speed is controlled to prevent photo-inhibition of the algae and to provide ordered mixing in which the algae is exposed to alternating periods of high photon flux density (PFD) and low PFD or darkness. The injected air also serves to add $O_2$ to the aqueous solution which is necessary for biological processes employed by both bacterial and algal communities in the tank to uptake nutrients. Additionally, the turbulence produced by the injected air in the tank causes solids-laden algae to break free and enter the flow of the water passing through the system. Continuous flow through the system carries the free algae particles, as well as any solids collected by the algae, toward the exit point of the system.

Air blowers are used to rotate the media wheels and the air distribution piping grid is designed to deliver and distribute air evenly to each media wheel. This gives this invention a significant advantage over other algae production systems because $CO_2$ exhaust gas can be efficiently and evenly distributed to the algae across the entire growing area. It also allows waste heat to be delivered evenly with the $CO_2$ throughout the algae/bacteria production system for optimum heating of the wastewater and air inside the greenhouse in colder climates. In addition, the water depth in the media wheel tanks is maintained at 15-inches. This shallow water depth allows the use of regenerative blowers which require far less energy to operate than centrifugal and positive displacement blowers. The shallow water depth also allows typical air delivery equipment used at coal plants to also be used to deliver air to the media wheel system.

Another object of this invention is to provide a wastewater treatment process and apparatus capable of producing large quantities of easily dewatered biomass. In a further aspect of the present invention, virtually all of the byproducts of this ecological and biological treatment process are used in other processes. For instance, in one aspect, as the algae and bacteria grow on the rotating media wheels the algae and bacteria colonies are dislodged from the rotating media wheel. Efficient removal of the solids-laden algae and bacteria colonies is accomplished.

The algae-based biomass can also be used in a regenerative energy system. Biomass obtained from the entire plant may be dried and thermally processed as part of an electricity generation process. Most types of thermal processes can be used with the algae-biomass including direct combustion, gasification, and pyrolysis. The byproducts of the thermal process, such as ash and $CO_2$, may be fed back to the media wheels to enhance and maximize the treatment process as well as the generation of additional algae biomass. As the process continues, the byproducts of the thermal process recycled back to the treatment system exceed the needs of the system, at which point an additional treatment system may be brought on line. This additional system produces additional biomass that can be likewise thermally processed to generate electricity. Further treatment systems may be brought on line as the thermally processed byproducts are recycled back to the systems until a desired equilibrium point is reached.

This invention sets itself apart from prior so-called "renewable" energy systems because the system of this invention is truly "renewable". Unlike ethanol and biodiesel plants which use more energy than they create, this invention not only produces enough biomass to produce its own energy to be self-sustaining but produces additional biomass for use outside the facility.

This invention also provides an extremely efficient means to significantly reduce or eliminate the carbon footprint of coal powered plants in a unique and new way. This is achieved by creating a renewable feedstock to replace the fossil fuel or a "fuel switch". As discussed previously, it is impractical to sequester and store all of the $CO_2$ emissions from the combustion of coal. It is much more practical to replace the coal. This invention eliminates the production of the $CO_2$ from fossil fuel coal in the first place by creating a "green coal" which has no carbon footprint when thermally processed. It is impractical to use a conventional WWTP to produce a "fuel switch" because a conventional WWTP uses more energy than could be created by the biomass it produces and because it cannot create additional biomass through photosynthesis. Likewise, it is impractical to use a conventional algae production system such as a photo-bioreactor, pond, or raceway system because of the lack of biomass from the bacteria. It is only through the combination of bacterial and algal biomass, as provided by this invention, that it becomes practical to produce a "fuel switch".

This invention also provides a cost effective and efficient means of capturing $CO_2$ emissions from $CO_2$ generators, such as coal plants, because wastewater is typically carbon limited. Algae found in wastewater is comprised of a carbon:nitrogen: phosphorous mixture typically with a C:N:P ration of 50:8:1. Wastewater typically has a C:N:P ratio of 20:8:1. Therefore, carbon is the limiting factor in algae growth using wastewater and presents an opportunity to add more carbon, specifically $CO_2$ to the wastewater to not only capture the carbon but increase the treatment efficiency of the system. As the compositions show, algae biomass can be more than doubled by the addition of $CO_2$ in wastewater.

A small municipal wastewater treatment plant embodying a media wheel 66 as the treating means was constructed as illustrated in FIG. 4, and as described in more detail herein. An average algae biomass production rate of 0.25 lb/media wheel/day was achieved which is equivalent to 662.5 tons/acre/year or over 6 times the production rate of the most efficient algae production systems. It is also noted that the 0.25 lb/media wheel/day production rate was not enhanced with $CO_2$. Based on algae studies utilizing $CO_2$ enrichment, it is anticipated that the production rate will increase significantly. The U.S. EPA estimates that there are 16,225 wastewater treatment plants in operation treating over 40 billion gallons of wastewater daily. Based on a conservative production rate, 21.9 million dry tons of high BTU value algae biomass could be generated each year from the U.S. treatment plants implementing the present invention. The algae and undigested sludge biomass has a BTU value of approximately 10,000 BTUs per dry pound which is equivalent to a typical coal BTU value. Therefore, if the U.S. converted all of the wastewater treatment plants to the algae treatment systems of the present invention, the combined biomass generated by these facilities could replace approximately 2% of the 1,046 million tons of coal consumed in the U.S. each year. This conservative estimate does not include the additional biomass that would be generated from $CO_2$ supplementation. Compare this to the EPA's estimated 8 million dry tons of relatively low BTU value bacteria based sludge that is currently being generated each year.

This invention also provides for improved solids removal over existing bacteria based wastewater treatment processes. Algae grow rapidly, trapping suspended solids and removing dissolved organic matter to utilize both types of materials as food. Through photosynthesis, the organic material is converted to new compounds by the algae, and oxygen is released. This oxygen oxidizes sewage solids that cause sludge separation and compaction. The coagulating effect of algae filaments, together with the effect of oxidation, produces a heavy, dense algae mass that is easily settled or removed, yielding a clear effluent.

This invention provides for improved nutrient removal over existing bacteria based wastewater treatment processes. Current bacteriological treatment plants discharge nitrates, phosphates, sulfates, etc. into some natural body of water for dilution and continued treatment by natural occurring plant and animal life. It is recognized that such nitrates and phosphates in wastewater have increasingly become a problem because they cause a great increase in the amount of algae in our lakes and streams. This invention more nearly achieves the desired function of discharging water with only its natural mineral elements because it uses the plant life portion of the cycle of life and death instead of the death and decay portion. Nitrates, phosphates and their antecedents are plant foods, and as such, are assimilated by the algae through photosynthesis. Algae can metabolize nitrogen and phosphorous far more rapidly than it can be treated by bacteria. Treatment is more complete and more rapid, since bacteriological treatment is a process of decay, whereas algae treatment is one of conversion of organic matter to live, healthy plant life.

The foregoing objects are achieved in the practice of this invention by the symbiotic relationship and environmental operating conditions created by the media wheel. In a preferred embodiment, wastewater treatment, GHG abatement and capture, and biomass production are facilitated by providing a media wheel for the growth of living phototrophic and non-phototrophic bacteria and algae and means for moving the media wheel through said wastewater and to expose the algae and phototrophic bacteria to light for sufficient portions of time to maintain the growth of the phototrophic bacteria and algae. The oxygen produced from the algae as well as from the rotation of the media wheel in and out of the water will maintain the growth of the non-phototrophic bacteria. Multiple media wheels in series and separate stages are provided for the necessary treatment level of the wastewater, capture of GHGs, and production of biomass. A portion of the media wheel is disposed above the water surface level of the wastewater in order to provide exposure to light and by its rotation to transmit to the wastewater dissolved oxygen from the atmosphere and algae. The algae is maintained in a wet condition through its submergence and by retaining water thereon by centrifugal force. The algae must also be provided with sufficient light, either direct natural sunlight or sunlight delivered via fiber optics to maintain algae growth. In cold climates, the media wheels are enclosed in a greenhouse to protect the algae and bacteria from freezing or near freezing temperatures.

The algae utilized in the practice of this invention are of the types naturally occurring in sewage. Such algae are both filamentous types having extended filaments and micro-algae. The filamentous algae are coated with a sticky mucous which seizes and holds solid particles, including colloidal particles. Filament particles loaded with sewage solids are broken off by the air rotating the media wheel and the scouring action of the liquid against the media wheel fins as the media wheels are rotated through the wastewater. Sewage solids which are trapped on such algae filaments may be held for hours before each filament breaks off from the supporting bed of algae and the resulting mass of sludge settles in a coarse, heavy and well-oxidized form.

In certain embodiments, half of the internal portion of each media wheel may include a bio-media for the growth of non-phototrophic bacteria. These non-phototrophic bacteria oxidize the organic carbon in the wastewater and convert it to $CO_2$ for the algae.

At night photosynthesis may be continued if artificial light is supplied. This, however, is not necessary to maintain suitable oxygen levels in the media wheel system for round the clock growth and respiration by both phototrophic and non-phototrophic organisms. During the day, algae saturate the water with oxygen. At night, when the algae respire, the oxygen level drops but not lower than 3-4 mg/l as witnessed in small scale media wheel pilot testing. The aeration and rotation of the media wheel into and out of the water provide enough oxygenation of the water to keep the media wheel environmental conditions optimal for biological activity 24 hours per day, 365 days per year. The aeration and rotation also provide for excellent gas exchange and prevent buildup of gases like closed loop photo-bioreactors.

Using wastewater as a means of growing algae is advantageous in cold climates because wastewater coming into WWTPs is typically between 50-70° F. year round. Using both algae and bacteria to treat wastewater is also advantageous because the biological organisms in the treatment process are much more diverse which increases the stability and dependability of the system to withstand hydraulic and organic shocks.

DESCRIPTION OF THE ILLUSTRATED EMBODIMENTS

Figure 1:
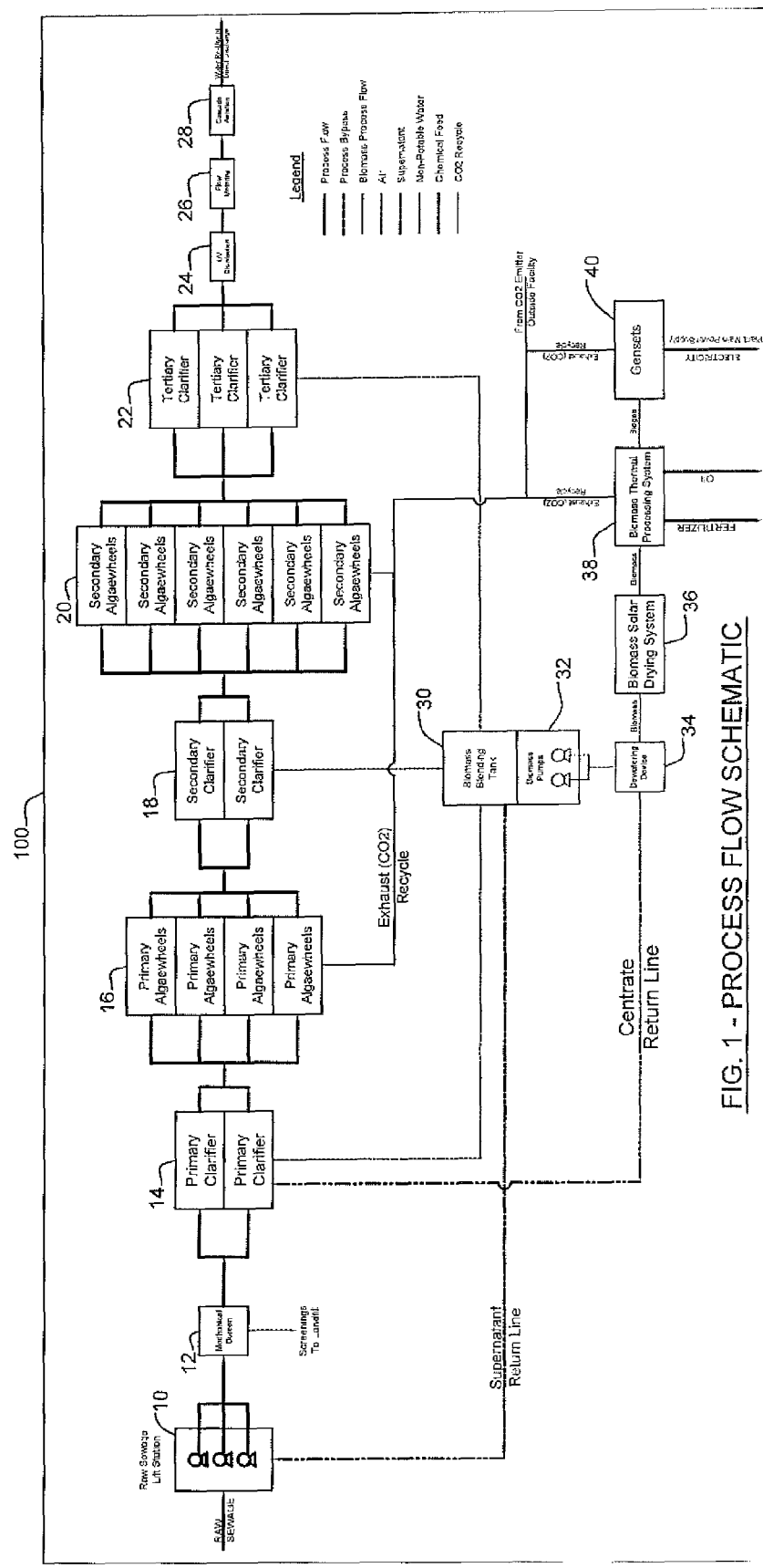
FIG. 1 is a process flow diagram of a wastewater treatment plant (WWTP) according to one embodiment of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Algae have never been successfully used for primary and secondary treatment in wastewater treatment plants because algae must have light for a large portion of the time to grow. During daylight hours algae gives off oxygen as a by-product and at night it produces carbon dioxide. If all light is cut off, it will ultimately die. Wastewater is so turbid that algae never forms in treatment plants in sufficient quantities to be utilized until after the treatment process. However, if algae is moved into and out of wastewater exposing it to sunlight, algae will grow profusely and metabolize additional components in the wastewater.

The bacteriological treatment of wastewater requires oxygen on large quantities from the atmosphere which can be completely supplied by algae if it is allowed to grow. The oxygen released into the wastewater by algae contributes materially to the removal of solids from the wastewater. It has been found that if a small amount of dissolved oxygen is introduced into settling wastewater solids, the solids settle far more quickly and the solids coagulate better, cohere better and are freely drainable so that they can be dewatered and dried much more efficiently that a bacteria only based sludge.

In one aspect of the present invention, the dense mat of algae which grows on the fins of an algae media wheel also functions as a mechanical filter. In algae raceways and ponds, the algae mats soon become clogged by solids trapped by the algae. Such solids then exclude light from the mat and the algae die. By aerating the media wheel and moving the bed of algae through the sewage, a scouring action is created causing the solids-loaded filaments to break off exposing new filaments for treatment, growth, and filtering action. Mechanical clogging is avoided and the algae is alternately exposed to the light to maintain its growth and submerged in the wastewater to provide biological treatment and mechanical filtration.

Such exposure to light will usually be achieved in adequate amounts during daylight hours. It should be noted, however, that too much direct sunlight is harmful to algae leading to photo-inhibition. The rotation of the media wheel eliminates this problem.

Although there are thousands of species of algae, the present process preferably uses micro-algae as well as multi-cellular filamentous algae which is capable of attaching itself to fixed media, such as the plastic media wheel. The algae sheathes itself in a sticky, gelatinous film capable of seizing and holding solid particles of all types including colloidal material and bacteria. This type of algae is inherent in sewage.

The media wheel when maintained wet may be manipulated to expose it to sunlight either directly or through fiber optics or suitable artificial light, and alternately to submerge it into contact with the wastewater. Such alternate exposure to light and sewage has been found to promote the growth of algae resulting in the formation of a heavy mat of algae on the media wheel. This mat of algae constitutes a biological and mechanical filter removing nutrients biologically and particulate matter mechanically and unloading such material in tightly bound aggregates quite differently from the commonly known flocculent solids. Most of the bacteria generated by the biological components of the media wheel are bound up in the solids trapped by the algae. Oxygen is known to improve the settling efficiency for settling wastewater solids.

Figure 2:
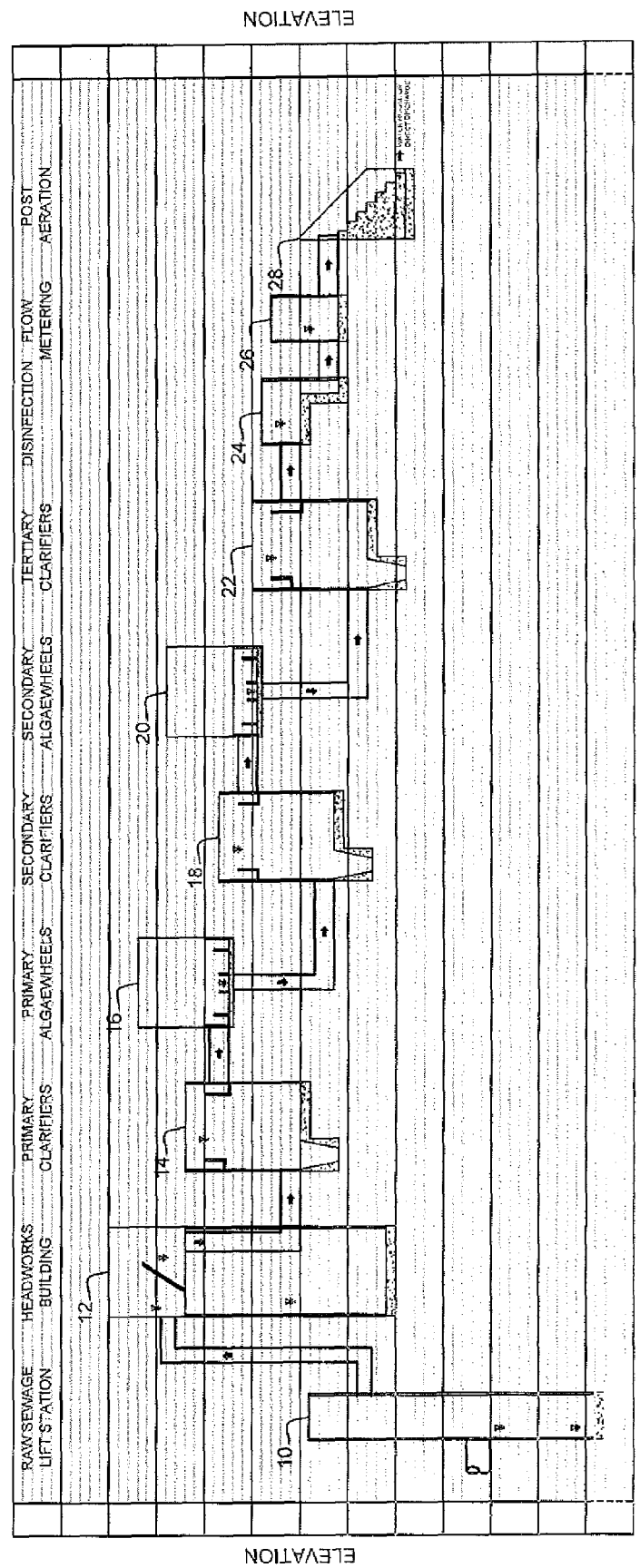
FIG. 2 is a hydraulic profile of the WWTP shown in FIG. 1.
Figure 3:
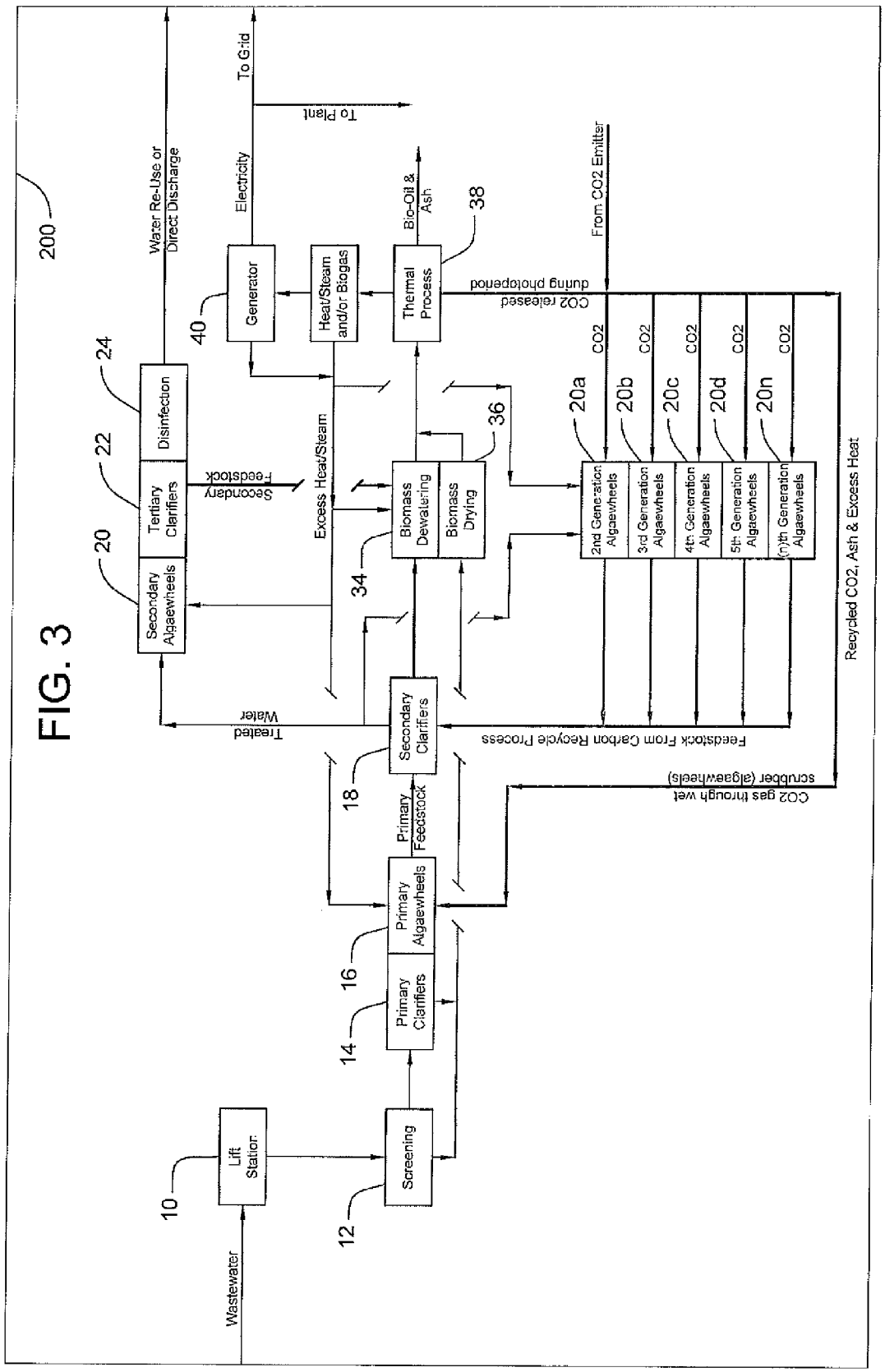
FIG. 3 is a process diagram of a regenerative energy system according to an embodiment of the present invention using the wastewater treatment facility shown in FIG. 1.

Referring to FIGS. 1-3, raw sewage is introduced into a wastewater treatment plant 100 to a raw sewage lift station 10 which contains an adequate number of pumps with capacity to handle the average and daily peak design flows to the WWTP. Wastewater is then pumped through a force main to a mechanically cleaned fine screen 12 that removes paper, plastics, and large solids. The screened wastewater then flows by gravity to primary clarifiers 14. The primary clarifiers 14 are typically sized to remove 30% of the BOD and 70% of the TSS (total suspended solids) in the wastewater. If desired, chemicals may be used through chemically enhanced primary clarification (CEPC) to increase the BOD and TSS removal in the primary clarifiers 14. The wastewater then flows by gravity from the primary clarifiers 14 to the primary media wheels 16 where the wastewater is contacted with living micro-algae, filamentous algae, and photosynthetic and non-photosynthetic bacteria. The primary media wheels 16 operate as a carbonaceous organic compound removal stage where the majority of the BOD is converted to $CO_2$ by bacteria. The algae remove nitrogen and phosphorous in the wastewater and convert the $CO_2$ from the bacteria to oxygen and biomass.

The wastewater then flows by gravity from the primary media wheels 16 to secondary clarifiers 18 where settling and separation of the biomass generated from the primary media wheels 16 occurs. The clarified effluent from the secondary clarifiers 18 is then conveyed by gravity to a secondary media wheel system 20. In the secondary media wheel system substantially all the remaining BOD is converted to $CO_2$ by bacteria and all of the $CO_2$, nitrogen and phosphorous is removed by the algae. The water then flows from the secondary media wheels to tertiary clarifiers 22. In the tertiary clarifiers 22 the coagulated solids are permitted to settle and are removed from the water. The clarified effluent from the tertiary clarifiers 22 then flows by gravity to a disinfection unit 24, which may provide chlorination/de-chlorination or ultra violet (UV) disinfection. The disinfected water then flows by gravity to a flow metering device 26 which could be a parshall flume and then flows by gravity to a re-aeration device 28 which could be cascade aeration. At that point the water is clean enough to meet the most stringent regulatory discharge requirements and may be discharged to a body of water or re-used for another purpose.

The solids (biomass) removed from the screening 12, the primary clarifiers 14, the secondary clarifiers 18, and the tertiary clarifiers 22 are collected in a biomass blending tank 30 where the biomass is mixed to obtain a uniform biomass for further downstream processing. The biomass from the clarifiers 14, 18, 22 will have a suspended solids concentration of approximately 2-4 percent. The solids content can be increased in the biomass blending tank 30 by decanting supernatant back to the head of the plant as shown in FIG. 1. The biomass is then pumped using biomass pumps 32 to a dewatering device 34. The biomass pumps may be of any the type used in conventional WWTPs to pump sludge, such as progressive cavity or peristaltic pumps. The dewatering device may be of any type used in conventional WWTPs, such as a centrifuge or belt press.

Due to the coagulating effect of the algae on the solids, the efficiency of dewatering is greatly enhanced. Typical solids concentrations of the biomass from the dewatering device will be between 20-30% solids based on pilot testing. The dewatered biomass is then conveyed to a biomass dryer 36 which may be any type used in conventional WWTPs, such as a solar drying system. A solar drying system is preferred over other types of driers if land is available in order to minimize energy requirements at the WWTP. If land is an issue then a screw type biomass dryer can be used, for example. The biomass drying system 36 will dry the biomass to the optimum moisture content desired for the downstream processing system.

After drying 36, the biomass is conveyed to a thermal processing system 38, which can be a number of systems such as an incinerator, combustion system, gasification system, or pyrolysis system. As an alternative to thermal processing, the biomass can be sold as a high BTU value biomass, fertilizer, animal feed, or other uses. The algae biomass can also be sent to a conventional anaerobic digester if desired. It has recently been discovered that adding algae to an anaerobic digester substantially increases the biogas produced and almost completely eliminates the corrosive nuisance gases typical in digesters using bacteria based sludge. It is also within the contemplation of this invention that the screenings and biomass from the individual clarifiers be kept separated for different uses. For example, the screenings may be taken to a landfill, the primary biomass thermally processed for energy, the secondary biomass processed for fertilizer, and the tertiary biomass processed for bio-oil.

Figure 4:
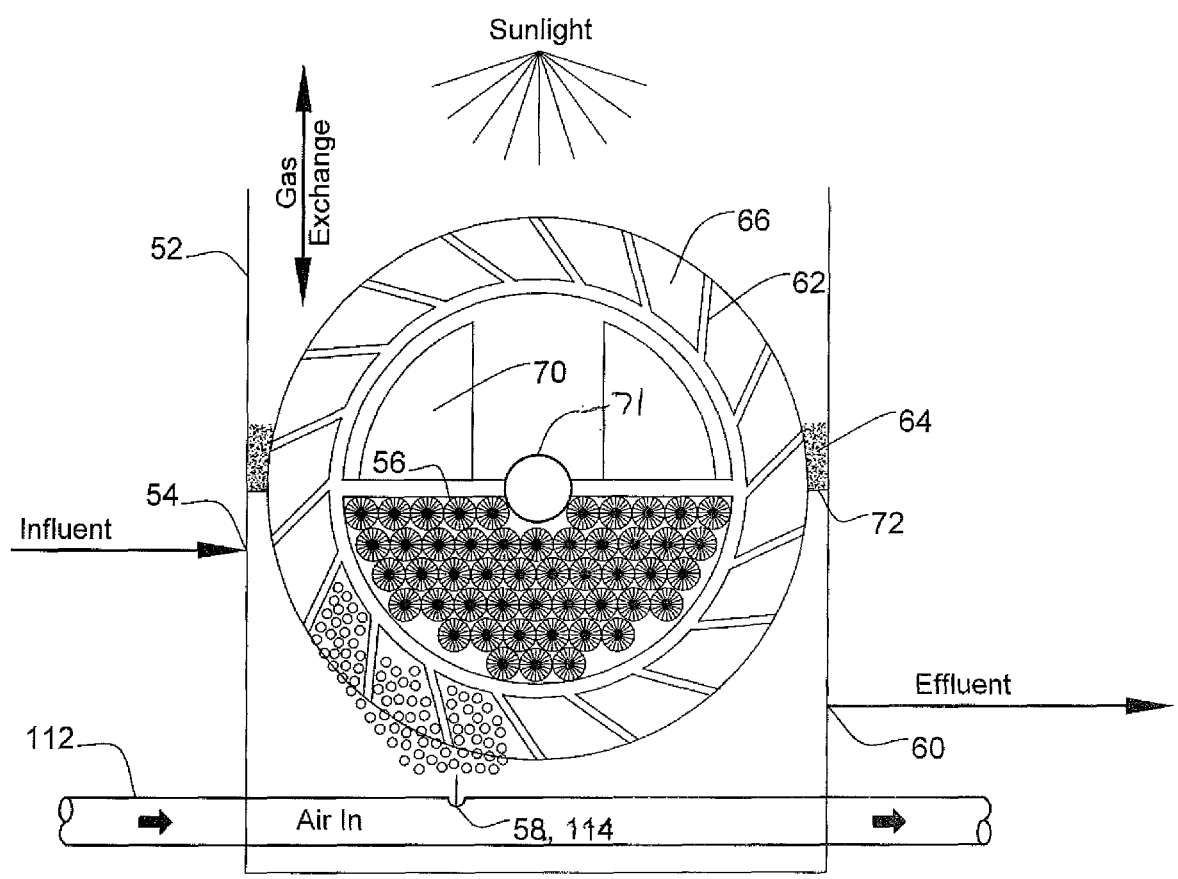
FIG. 4 is a cross-section view of a media wheel used in the WWTP shown in FIG. 1.

Details of the media wheel used in the primary media wheel system 16 and secondary media wheel system 20 are illustrated in FIG. 4. In certain embodiments described herein, the media wheel systems 16 and 20 employ technology described in U.S. Pat. Nos. 5,647,983, 5,755,961, and 6,158,386, the disclosures of which are all incorporated herein by reference, and particularly the disclosure of the treatment unit 66, as shown in FIG. 4 of the patents. While details of the treatment unit 66 in the present primary media wheel system 16 and secondary media wheel system 20 may be obtained from these patents, a general description follows with reference to FIG. 4 of the present application.

A primary component of the primary media wheel system 16 and secondary media wheel system 20 is the media wheel 66 that is supported within a tank 52 for rotation about an axle 71. The media wheel 66 includes air capture members, or fins, 62 that are used to rotate the media wheel within the wastewater entering the tank 52 at inlet 54. In particular, diffused air provided by an external air blower 80 (FIG. 7) through conduit 112, exits air outlet 58 to impinge on the fins 62 to rotate the media wheel. The fins are preferably configured to, in effect, capture an air pocket between successive fins so that the relative buoyancy of the air pocket will rotate the media wheel as the air pocket rises within the tank. In addition to providing a motive force for rotating the media wheel, the air also introduces oxygen, heat, and $CO_2$ into the wastewater for beneficial reasons explained in more detail herein.

In the illustrated embodiment, the media wheel 66 includes a biological filter media 56 contained in one internal portion of the media wheel. This media is configured to support bacterial growth, such as plastic bio-balls. The bio-balls are preferably configured to provide a high surface area to volume ratio. As explained above, treatment of the wastewater requires bringing the organic and inorganic compounds within the wastewater into contact with bacterial colonies that use the compounds as food. The wastewater level 72 within the tank 52 is maintained so that the filter media 56 will be alternately submerged into and lifted out of the wastewater, which beneficially enhances the transfer of nutrients, oxygen, and $CO_2$ between the bacterial colony and the wastewater.

While one portion or half of the media wheel interior is filled with the biological filter media 56, the remaining internal portion or half 70 is preferably empty. Thus, as the media wheel 66 rotates, the filter media 56 alternately displaces the wastewater, producing a continuous raising and lowering of water level 72 or surge of the wastewater within the tank 52. This continuous movement increases the nutrient removal rate of algae carried by the media wheel 66. The fins 62 also provide the surface area on which the algae grows. The three-dimensional geometry of the media wheel 66 provides an algae growing surface area over 7.6 times the two-dimensional footprint of the media wheel 66 giving it a significant advantage over ponds and raceways. Movement of the fins 62 into and out of the wastewater provides for efficient gas exchange between the algae, water, and air, and provides a varying intensity of natural light on the algae, all of which leads to healthy and continuous growth of the algae. Furthermore, rotation of the fins and thus the algae into and out of the water controls the exposure of the algae to alternating periods of high photon flux density (PFD) and low PFD or darkness. This ordered mixing of light and darkness prevents photo-inhibition of the algae growth associated with continuous exposure to light and enhances the algal growing cycle.

Figure 5:
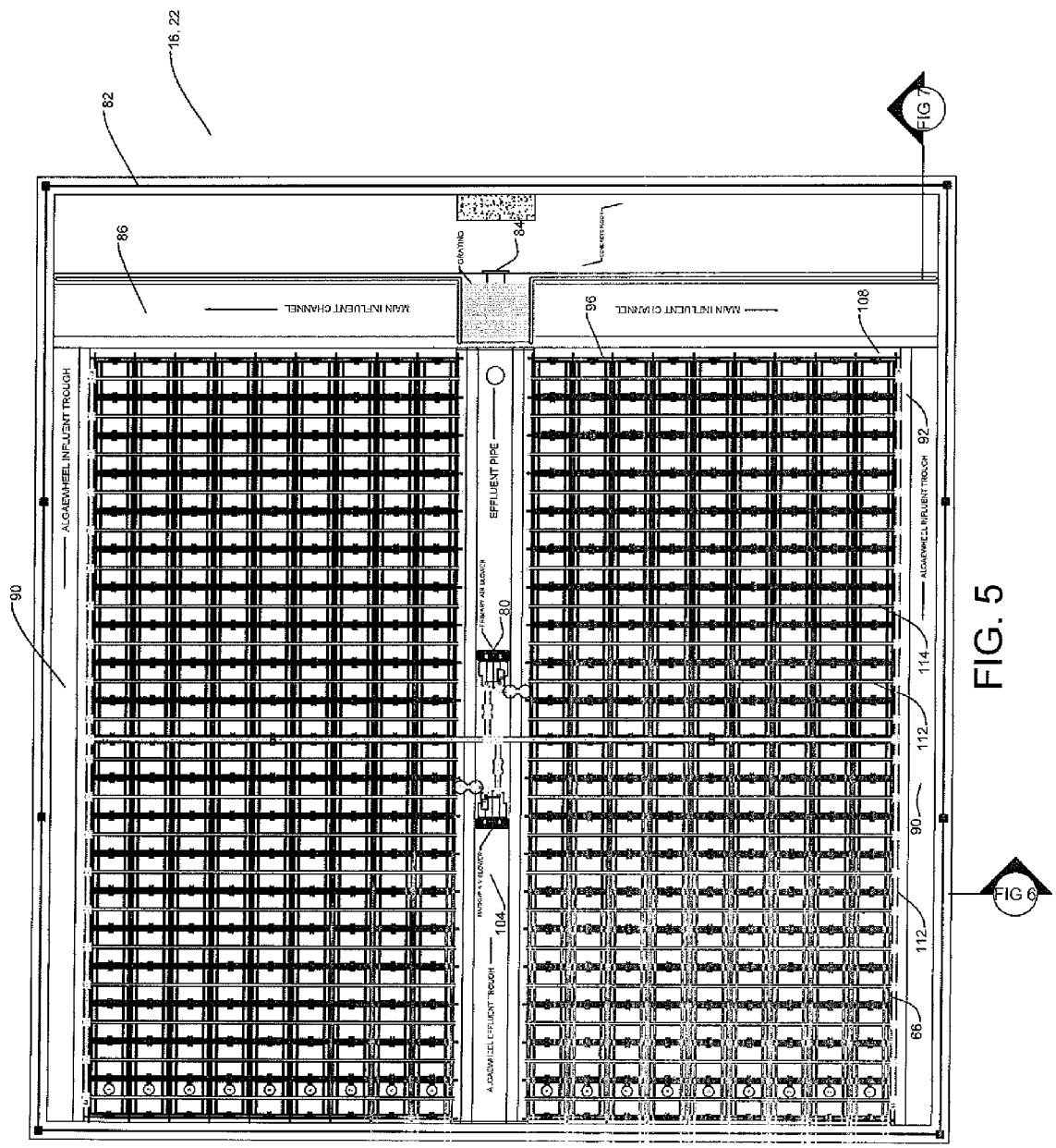
FIG. 5 is a plan view of a primary and secondary media wheel treatment, GHG abatement and capture and biomass production system used in the WWTP shown in FIG. 1.
Figure 6:
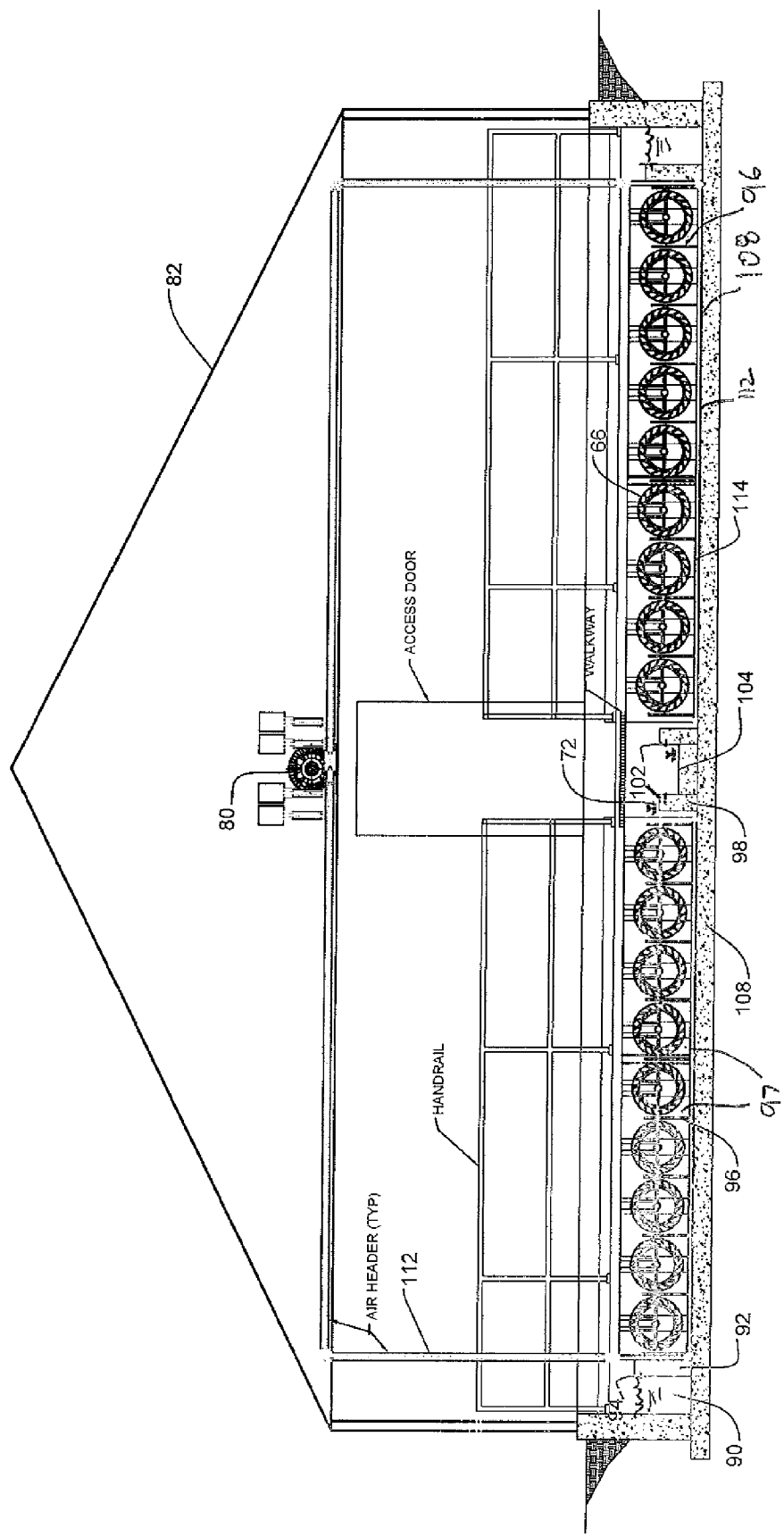
FIG. 6 is a section view of the primary and secondary media wheel treatment, GHG abatement and capture, and biomass production system shown in FIG. 5.
Figure 7:
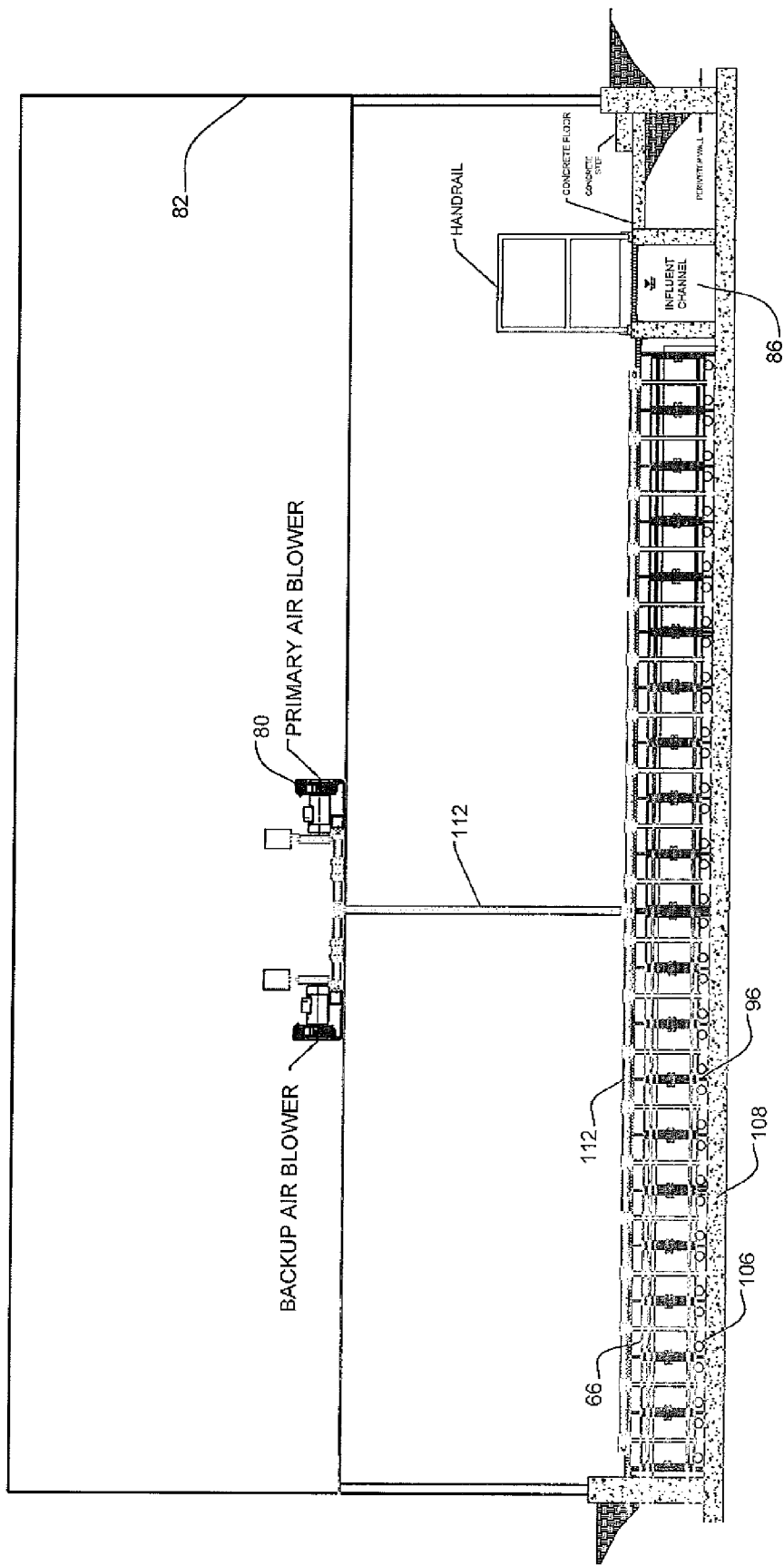
FIG. 7 is another section view of a primary and secondary media wheel treatment, GHG abatement and capture, and biomass production system shown in FIG. 5.

Still yet another benefit of the raising and lowering of water level 72 is that it allows air to be evenly distributed to multiple media wheels 66 as employed in the facilities shown in FIGS. 5, 6, and 7. When air is delivered to an air piping grid with a constant water level, the air will tend to unevenly split to the "path of least resistance" and air valves must be used to control air flow split. The raising and lowering of the water level 72 in the tank 52 creates a varying head on the air distribution system forcing the air to evenly split to each media wheel 66 in the grid without the need for air valves.

The air jet at the outlet 58 is beneficial for the growth of the algae and phototrophic bacteria because the air jet foam fractionates the wastewater. This foam 64 collects at the surface of the water between the media wheel 66 and the walls of the container. This foam bears against the fins 62 and more particularly the algae and phototrophic bacteria growing thereon so that the algae and phototrophic bacteria can readily extract the necessary nutrients and solids within the foam 64.

It can be appreciated that the bacteria growing on the bio-media 56 and the algae and bacteria growing on the fins 62 forms a biomass that can be used for bio-diesel, fertilizer and other uses described above. The primary media wheels 16 and secondary media wheels 20 thus contemplates that the algae will be continuously dislodged from the fins 62 and allowed to pass into the secondary clarifiers 18 and tertiary clarifiers 22. The air jet through outlet 58 can dislodge algae from the screen once the algae colony reaches a critical mass. A scraper is normally not needed but may also be provided, as described in U.S. Pat. No. 5,647,983, the disclosure of which is incorporated herein by reference. Once removed from the fins 62, the algae biomass is withdrawn through outlet 60. The primary treatment outlets 60 of the primary medial wheels communicate with the secondary clarifiers 18 and the outlets 60 of the secondary treatment units communicate with the tertiary clarifiers 22 as shown in FIG. 1. The secondary clarifiers 18 and tertiary clarifiers 22 serve primarily as settling tanks for final removal of biomass released from the primary treatment system 16 and the secondary treatment system 20 respectively, the biomass consisting of algae and bacteria. The algae stripped from the fins 62 of the media wheel 66 are filamentous and are coated with a sticky mucous which facilitates the settling of residual solids within the clarifiers by coagulation of the biomass, which also facilitates removal.

No additional treatment of the effluent after post aeration 28 is required because the resulting effluent is free of the toxic materials present in the original wastewater. The total suspended solids (TSS) are also virtually eliminated through the facility 100. The nitrogen and phosphorous typically contained with wastewater is food for the bacteria and algae colonies resident within the primary treatment system 16 and secondary treatment system 20. The algae convert nitrogen and phosphorous, through photosynthesis, into algae biomass and oxygen. The oxygen oxidizes wastewater solids, thereby facilitating compaction or coagulation of the solids. As explained above, the oxygen also fuels the growth of the bacterial colonies in the media wheel 66, while the bacteria produces $CO_2$ which helps fuel the growth of the algae. Thus, the entire system provides a virtually self-sustaining ecologically-driven cycle, fueled by the toxic materials in wastewater and sunlight.

A greenhouse 82 constructed of glass, a plastic, such as twin-wall polycarbonate, or other transparent or translucent material, may be placed over the primary media wheel system 16 and secondary media wheel system 22 to protect the algae and bacteria, as illustrated in FIGS. 5-9. One benefit of the greenhouse 82 is that the primary media wheel system 16 and secondary media wheel system 22 may be wholly contained within a greenhouse 82, as shown in FIG. 6. The greenhouse 82 protects the primary media wheel system 16 and secondary media wheel system 22, and particularly the media wheels 66, from cold temperatures, predation from animals and insects, and acts to filter damaging ultra violet light from the sunlight to protect the algae. The greenhouse 82 may be vented by the media wheel blowers 80 to maintain an optimum atmosphere for operation of the media wheels. This feature advantageously eliminates the additional capital cost and energy costs typically required to ventilate and heat greenhouses for optimum plant growth. It is also advantageous because it provides a means to easily and efficiently deliver heat and $CO_2$ gas to the media wheels 66 and trap and contain the heat and $CO_2$ within the greenhouse for optimum algae growth year round. The greenhouse 82 may be any size and shape to accommodate the desired primary media wheel system 16 and secondary media wheel system 22. It will be understood that the housing may also be varied in design to accommodate needs for servicing, testing, maintenance, etc. for any specific primary media wheel system 16 and secondary media wheel system 22 which may be used in accordance with principles knows to those skilled in the art.

Research has shown that the rate of algal growth doubles with every 20° F. rise in water temperature. During the winter months it is desirable that the algae be maintained at temperatures above freezing, and preferably above 50° F. since the algae and bacteria will stop growing at very low temperatures and will grow at a very slow rate at temperatures below about 40° F. During the summer months it is desirable that the greenhouse temperature be kept below 100° F. to optimize algae growth. This can be accomplished by opening vents in the greenhouse. In some locations where year-round temperatures remain moderate, the use of a greenhouse may not be necessary to maintain the algae and bacteria at optimal growing temperatures.

Figure 9:
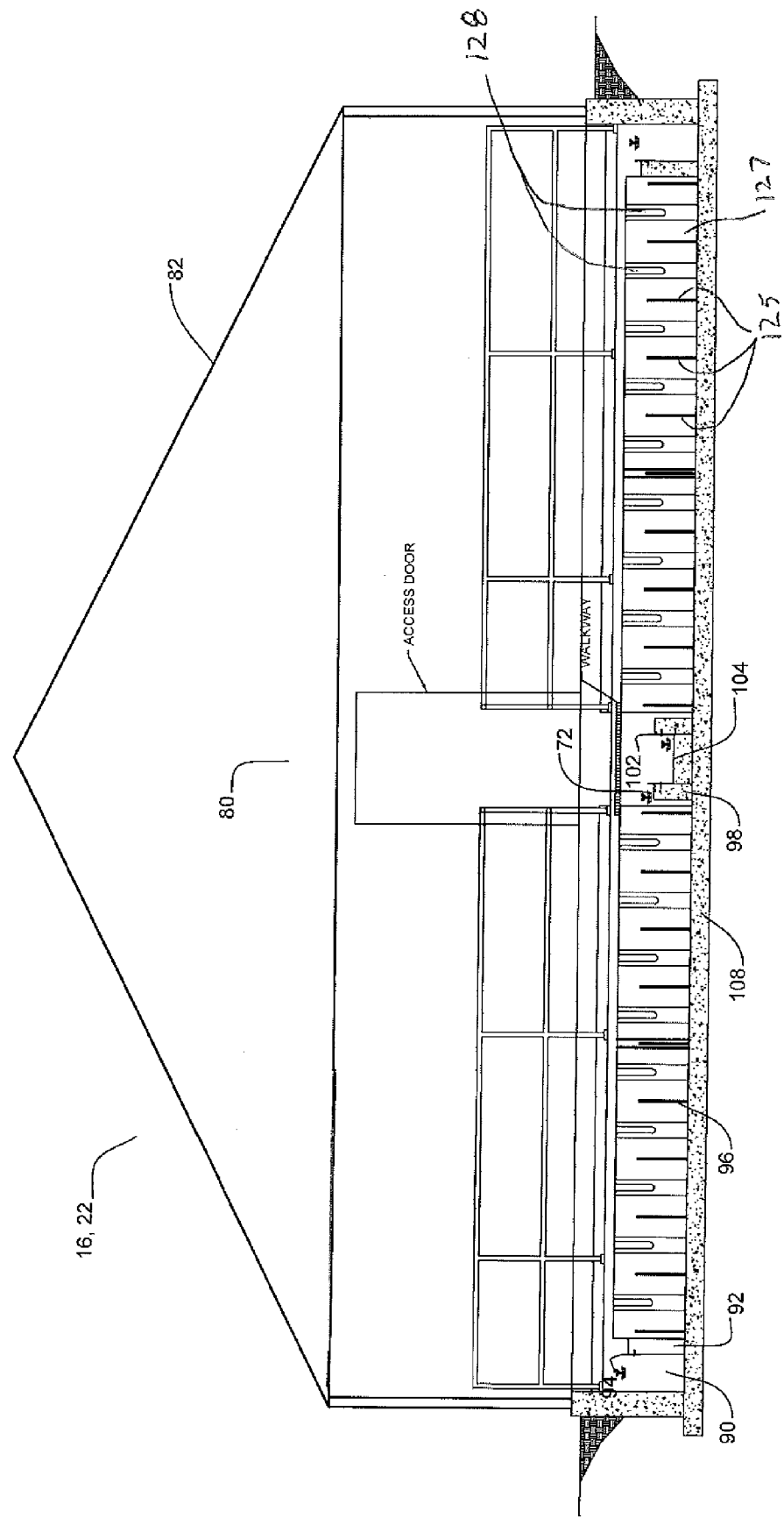
FIG. 9 is an end view of the grid shown in FIG. 8.
Figure 10:
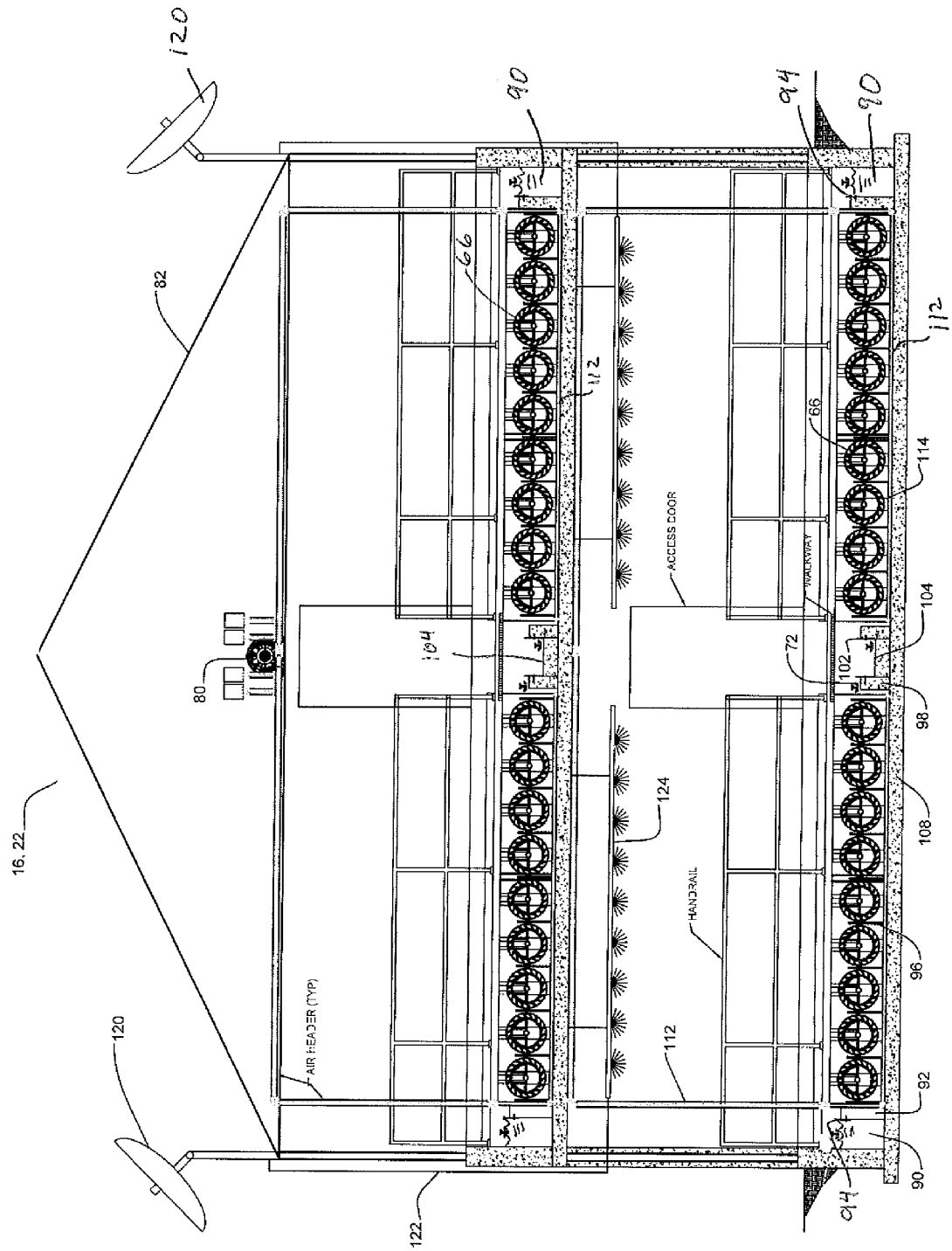
FIG. 10 is a side view of a multi-level primary and secondary media wheel treatment, GHG abatement and capture, and biomass production system according to a further embodiment of the invention.

In applications where land space is limited, the primary media wheel system 16 and secondary media wheel system 22 may be constructed as a multi-level facility as shown in FIG. 10. Each level of the multi-level facility is configured substantially identical to the single level systems shown in FIGS. 5-9. It can be appreciated that a pump system may be required to directly influent into the upper level, while the discharge from the level may be gravity fed to merge with the discharge from the lower level. This multi-level construction is feasible with the present invention due to the shallow water depth (approximately 15 inches) maintained in the primary media wheel system 16 and secondary media wheel system 22. A conventional activated sludge facility cannot be constructed in this manner due to their required deep side water depths of 10 feet and greater. The floor loading from the primary media wheel system 16 and secondary media wheel system 22 would be approximately 78 pounds per square foot which can easily and economically be provided in multi-level building structures.

It can be further appreciated that the upper level may receive ambient sunlight through the roof of the transparent or translucent greenhouse 82. Both levels will receive additional sunlight through the side walls of the greenhouse. However, the primary and secondary media wheel systems in the lower level may require still more sunlight, equivalent to the light received by the upper level through the roof of the greenhouse. In a further aspect of the invention, light fixtures 124 are placed on the ceilings on at least the lower level, as depicted in FIG. 9, to provide the necessary light for the algae and phototrophic bacteria. The light fixtures 124 may be artificial light fixtures. However, it is preferably that the light exposure to all the algae media wheels be natural light. Thus, in the illustrated embodiment, solar collectors 120 feed natural sunlight via light pipes 122 to the light fixtures 124 within the facility.

The means provided in the illustrated embodiments of the present invention for rotating the media wheels provide the desired contact between the wastewater, air, bacteria, and algae, and also permit the algae to have sufficient contact with light to promote natural growth. A further important function of the continuing alternate submergence of the algae within the liquid and its movement through the atmosphere is that it eliminates photo-inhibition which is the single biggest problem in efficient algae production. Algae growth efficiency increases dramatically when it is grown under short periods of light and dark cycles. According to recent scientific studies, algae production is optimized with intermittent light and dark cycles of 5 to 15 seconds. The rotational speed of the media wheels 66 can be maintained by controlling the water level 72 such that the RPM of the media wheels 66 is approximately 3-10 RPMs providing an intermittent light and dark cycle of 6-20 seconds. Constructing the media wheel 66 of lightweight plastic material to create a buoyant media wheel 66 allows even greater flexibility in the speed of the media wheel 66 simply by changing the quantity of air through outlet 58 and water level 72. The lighter media wheel 66 also allows less air to be used per media wheel 66 which reduces the energy consumption of the facility 100. A further important function of the continuing alternate submergence of the algae within the liquid and its movement through the atmosphere is that the algae and bacteria may be thereby maintained wet which is necessary for its growth and also at sufficient speed to prevent any substantial drying of the algae bed during its passage through the atmosphere.

The facility 100 shown in FIG. 1 may also be incorporated into a regenerative energy system 200, as shown in FIG. 3, in which the byproducts of the facility are used as fuel for electricity generation and the byproducts of the electricity generation are used as "fuel" for the facility. The entire regenerative energy system uses raw sewage as "fuel" and is essentially powered by solar energy so that the losses associated with the generated byproducts is minimal. The facility 200 is identical to facility 100 described above except that additional secondary media wheel units 20a through 20n are added. The biomass produced from the facility 200 is processed in the same manner as described in facility 100 to drive a generator 40. The output of the generator 40 is electricity that can be provided back to power the facility 200 and/or to the power grid. In addition, some portion of the heat created during electricity generation may be diverted to the biomass dryer 36 and to the primary media wheels 16 and secondary media wheels 20 as needed.

The cycle of this process is completed by the transfer of exhaust gases from the biomass thermal process 38 and generator 40 back to the primary media wheels 16 and secondary media wheels 20 to fuel the algae growth in the facility 200 as explained above. The exhaust gases, namely $CO_2$, and heat enhance and maximize algae production, which leads to increased biomass production, which increases biomass thermal process 38, which results in greater electricity and/or biofuels production. Although this cycle gives the appearance of a perpetual energy cycle, the external, and essentially limitless, power source for the entire process is solar energy.

It is contemplated that facility 100 can treat the daily design flow for the specific raw sewage volume. Thus, it is contemplated that the facility 100 will be sized and configured to be solely dependent upon the nutrients contained in the wastewater provided at the pumping station 10. However, as suggested above, the regenerative aspects of the system 200 will produce greater amounts of thermally processed exhaust, namely $CO_2$, than is needed or that can be handled by the facility 100. Rather than exhaust these gases to waste, the present invention contemplates bringing an additional treatment facility 20a on line, as depicted in FIG. 3. This additional facility would receive effluent from the secondary clarifier 18 as well as ash, $CO_2$ and excess heat obtained from the thermal process 38 and generator 40. The algal growth cycle then commenced in this additional facility 20a until the same result is reached, namely that the algal growth has reached its limits in the additional facility and the byproducts have exceeded the capacity of the combination of the primary and additional facilities 100, 20a. At that time, a third facility 20b may be brought on line. This sequence of events is repeated until the full complement of treatment facilities 100 and 20a-20(n) is reached, as determined by the desired output from the thermal process. At that point, the exhaust gases that are not required to feed the many algae production facilities can be vented or stored in a suitable manner.

The treatment facilities 100 and 200 described herein provide a significant benefit in that the facilities are self-sustaining, with the process being fueled by wastewater and sunlight. In addition to the benefits of being self sustaining, the facilities described herein produce excess biomass that can be used for purposes outside the facility 100. The surplus biomass can be used as feedstock for thermal processing, co-fired, methane digesters, and the production of fertilizer or bio-fuels, such as bio-diesel. Processes are known for using the biomass in each of these environments, but to date the problem has been availability. In other words, there has been no renewable source of sufficient quantities of algae and biomass to support these external uses of the wastewater treatment by-products, or more pertinently to justify the investment in the processing facilities. Renewable energy from biomass is by far a more practical method than wind or solar because the biomass thermal technologies have a long track record of success with coal. In addition, biomass can be processed in the same manner as coal to deliver power to the grid when actually needed. Wind and solar are unreliable renewable energy sources because the power generation cannot be controlled. Power companies do not like wind and solar because they generally produce power at a time when the power company simply does not need it. Since electricity cannot be cost effectively stored, the renewable energy is wasted and has no value to the Power Company or consumer. Historically, the major problems with biomass have been the unreliability and inconsistency of its supply. Most biomass supplies cannot be guaranteed to be around forever and this simple fact creates too much risk for the investor. However, wastewater and sunlight are obviously very reliable and significantly reduce the risk associated with reliable and consistent biomass supply. The energy input to these facilities 100 and 200 is primarily from the sun. The biological processes occurring in the media wheel systems 16, 20 are self-initiating and self-sustaining. Therefore, the facilities 100 and 200 disclosed herein overcome the problems associated with renewable energy from biomass. The facilities 100 and 200 in fact, give the owner a means to guarantee their energy costs for the life of the facility.

Thus, the present invention provides an extremely environmentally-conscious solution to the ongoing problem of treating wastewater, with the beneficial adjuncts of abating greenhouse gases from wastewater treatment, capturing $CO_2$ from $CO_2$ emitters, and producing a renewable resource for use in other processes.

The wastewater treatment systems and processes of the present invention avoid the problems associated with prior algal biofuel production efforts. The rotating media wheels (FIG. 4) essentially increase the available surface area for algal growth. In the raceway ponds, the pond must be shallow enough for sunlight to reach the algae suspended and floating in the water flowing around the pond. With the present system, the rotating media wheels 66 continuously expose the algae colonies growing on the media wheel 66 surfaces to sunlight.

The raceway pond system requires injection of both $CO_2$ and nutrients into the pond for consumption by the algae. The system of the present invention utilizes both algae and bacteria which form a symbiotic relationship that leads to faster algal growth. While $CO_2$ may be introduced into the media wheels 66 of the present inventive system, it is not necessary. However, if available, additional $CO_2$ will support additional algae growth. Thus, the media wheel systems 16, 20 of the present invention may be used to treat both wastewater and waste $CO_2$ from an adjacent facility or factory.

Another benefit of the present system is that the algal biomass may be more easily extracted from the clarifier tanks 18, 22 of this system than from the raceway pond of the prior system. The raceway pond requires the use of scrubbers or skimmers drawn through the pond or through a diverted flow in order the harvest the algae. On the other hand, the present inventive system relies upon the aeration jets used to rotate the media wheels to dislodge the algal growth from the media wheel 66 surfaces. The dislodged algae will settle at the bottom of the clarifier tanks 18, 22 for easy removal.

It has recently been discovered that algae produces significant amounts of hydrogen gas during its photosynthesis reactions. Thus, the facilities described above may be modified to extract hydrogen gas, which may then be used as a fuel. The prior raceway pond systems are not adapted for extraction of hydrogen since the hydrogen gas will percolate from the entire surface area of the pond. On the other hand, the facility in FIG. 1 is readily adapted to extracting hydrogen gas emanating from a primary media wheel system 16 and secondary media wheel system 20, since the gas will collect at the top of the greenhouse 82.

A small municipal wastewater treatment plant embodying the media wheel 66 as the treating means was constructed as illustrated in FIG. 4. Each media wheel 66 was 16.5-inches in diameter and 15.5 inches wide. The system was initially operated with raw sewage entering two primary media wheels 66 in series followed by a clarifier and then two secondary additional media wheels 66 in series followed by a clarifier. The number of primary and secondary media wheels 66 was then increased to six media wheels in series and then finally to nine media wheels in series. The media wheels 66 were operated with wastewater flowing both parallel and perpendicular to the axle of the media wheel 66 with wastewater flowing through the media wheels in series. The media wheels 66 were operated at various water depths, various rotational speeds, various influent flows, and with and without artificial lighting. It was discovered through testing that wastewater must flow in a plug flow manner through two stages (primary and secondary) of media wheels 66, each stage of media wheels consisting of nine media wheels in series in order to consistently provide the necessary treatment required by regulatory agencies.

The total hydraulic retention time in the media wheel 66 tank 52 was 5.4 hours to achieve an effluent meeting regulatory requirements for direct discharge. An activated sludge process typically requires 12-18 hours of retention time to achieve this same level of treatment. This is mainly due to the additional nutrient removal via the algae in addition to the treatment provided by the bacteria. The pilot system also demonstrated the efficient settling of the solids as a result of the algae. The clarifiers used in the pilot test only provided a 2 hour retention time and were not baffled to dissipate flow energy but achieved a suspended solids removal rate that met regulatory discharge requirements. Clarifiers in conventional activated sludge plants are sized to provide over 6 hours of retention time in order to adequately remove suspended solids. This is because sludge from the activated sludge process does not form compacted sludge even though tremendous amounts of oxygen are introduced from the atmosphere to help activate the sludge. In fact, many activated sludge plants must add polymer to their clarifiers in order to settle sludge at all.

FIGS. 5-7 show the primary stage media wheels 16 and secondary stage media wheels used in facility 100 and facility 200. Both primary 16 and secondary 20 stages are identical in construction and operation but located within the facilities 100, 200 at separate stages in the process. The primary 16 and secondary 20 stages each include an array of multiple media wheels 66 arranged in trains of nine media wheels 66 in series that operate in plug flow fashion with multiple rows of media wheels 66 parallel to each other. The number of rows needed is a function of the quantity of wastewater to be treated and/or $CO_2$ capture desired and/or biomass production desired. The media wheels 66 are supported by a plastic grid network 96 that supports and allows the media wheels to rotate and creates individual chambers 97 for each media wheel 66 to provide a plug flow pattern through each nine wheel train. The grid network 96 includes holes 106 in the walls between each media wheel 66 chamber in each flow train that allow the wastewater, algae, and bacteria to travel from media wheel 66 to media wheel 66 and finally over an exit water control weir 102 to a common effluent channel 104 that feeds the effluent pipe 84.

Figure 8:
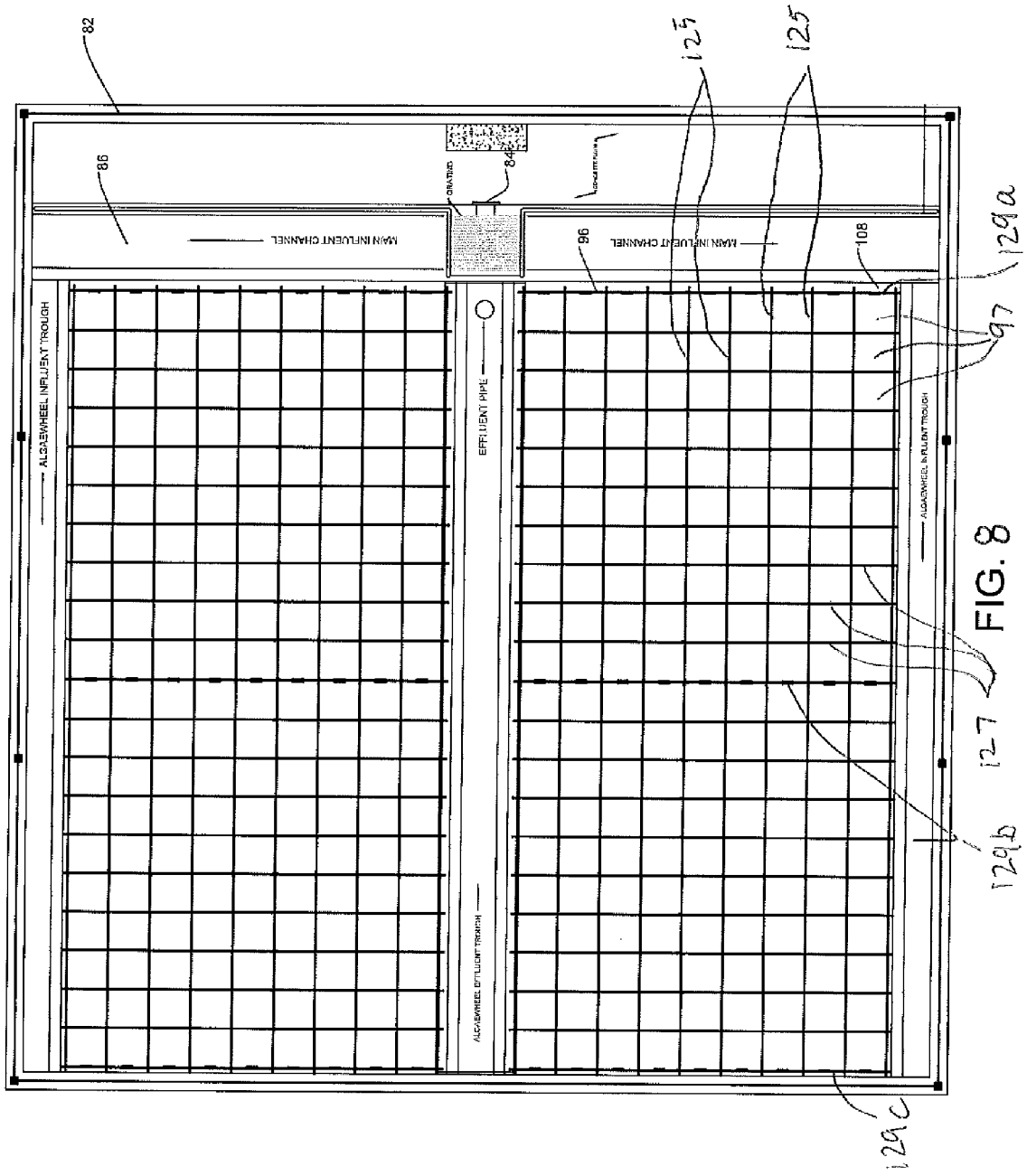
FIG. 8 is a top view of the grid for supporting the array of media wheels for the system shown in FIGS. 5-7.

As shown in more detail in FIGS. 8-9, the grid network 96 is formed by a series of parallel panels 125 mounted within the network tank 108 and extending from the main influent channel 86 to the opposite end of the tank. The network further includes a series of parallel panels 127 that are arranged perpendicular to the first panels 125 so that the combination of the panels 125, 127 defines the plurality of chambers 97 within which the individual media wheels 66 reside. Each of the perpendicular panels 127 defines a slot 128 to receive the axle 71 of the a corresponding media wheel. Alternatively, only three perpendicular panels 129a, 129b and 129c are provided with the slots 128. In this alternative embodiment, a single axle 71 extends along a given row of the matrix, supporting each media wheel within its own chamber 97. Bearing elements may be provided in each slot to support the axles 71 as necessary. It is contemplated that the interlocking panels 125, 127, 129a-c are formed of a durable plastic material capable of withstanding exposure to potential noxious wastewater. The grid network 96 may be pre-fabricated to be removably installed within each tank 108.

Influent wastewater is evenly distributed to the rows of media wheels 66 by utilizing a common influent channel 90 bordering the media wheel grid network tank 108. A common adjustable v-notch weir 94 is attached at the upper edge of the influent channel wall 92 in front of each grid network 96, as shown in FIG. 6. A series of v-notches along the weir 94 are configured to control and distribute the wastewater evenly to the media wheels 66 in the grid network 96. The water level maintained in the media wheel grid network 96 is controlled by utilizing a common effluent channel 104 bordering each network tank 108. A common adjustable effluent v-notch weir 102 is attached at the upper edge of the effluent channel wall 98 at the end of each grid network 96.

The grid network 96 also incorporates an air piping distribution system 112 which consists of air pipes running down each train of nine media wheels 66. An outlet 114 in the piping is located under each media wheel 66 in the correct location to allow the air to be captured in the media wheel 66 fins 62 (similar to the outlet 58 in FIG. 4). The raising and lowering of the water level 72 in each media wheel chamber 52 caused by the internal bio-media 56 alternately moving into and out of the water allows an even air split across the entire working media wheel grid network 96 without the need for air control valves. Air blowers 80 deliver the required air flow to rotate the media wheels 66 through the air piping network 112 included in the grid system 96. These blowers 80 also provide the means to deliver additional $CO_2$ from the thermal process or from a source outside the facility to the media wheels 66.

Thus, as disclosed herein, one embodiment of the present invention contemplates a process for simultaneously treating wastewater, abating greenhouse gases, capturing $CO_2$, and producing biomass which comprises flowing wastewater into contact with an apparatus housing living algae and bacteria to treat the wastewater, preventing the release and production of the greenhouse gases produced by the bacteria with the algae, delivering the $CO_2$ to the algae for capture through algae growth, moving the apparatus, algae and bacteria through the wastewater to aerate the wastewater and break off solids-loaded algae, separating the algae and bacteria from the wastewater, dewatering the algae and bacteria, and drying the algae and bacteria to create the biomass. The wastewater may be domestic, industrial, or agricultural wastewater. The process is particularly suited to removing $CO_2$ gas given off by bacterial respiration in aeration tanks, $N_2O$ gas given off by the bacterial nitrification process, and $CH_4$ gas given off by the bacterial digestion process. The $CO_2$ being captured also comes from a $CO_2$ emitter such as a power plants or distributed power production.

In accordance with one aspect of the invention, the apparatus for housing the algae and bacteria comprises at least one media wheel configured for growth of algae and bacteria thereon, the media wheel mounted for rotation within a tank so that a portion of the media wheel is immersed in wastewater during rotation and a portion of the media wheel is above the wastewater during rotation. This rotation thus alternately exposes the algae and the phototrophic bacteria growing on the outside of the media wheel to sunlight and to the wastewater to provide for the nutrient uptake by the algae and bacteria and resulting nutrient removal in the wastewater, to permit gas exchange with the atmosphere, and to create intermittent light and dark cycles on the algae and phototrophic bacteria. The media wheel may also contain an internal bio-media for non-phototrophic bacteria. The media wheel incorporates fins to capture air and to provide surface area for algae growth. The three-dimensional geometry of the media wheel may be configured to provide a total algae growing surface area of over 7.6 times the two-dimensional footprint. The media wheel may be preferably fabricated or injection molded of plastic to create a lightweight media wheel that is buoyant in the wastewater, thereby significantly reducing wear on the axle and bearing and reducing the amount of air required to rotate the media wheel.

In one feature of the invention, the rotational speed of the media wheel is controlled by the water depth in the media wheel tank. The rotational speed of the media wheels is also maintained at speeds to prevent photo-inhibition of the algae using a technique is called ordered mixing which forces the algae to undergo changes from periods of high photon flux density (PFD) to darkness. This cycle of going from high PFD to low PFD has been shown to enhance algae growth. The rotation speed is also sufficient to provide sufficient scouring of the biomass from the solids-laden algae from the media wheels. In one aspect, the delivery of $CO_2$ and moving the media wheel, the algae, and the bacteria through the wastewater can be simultaneously accomplished by injecting air below the apparatus to rotate the apparatus.

The process and system disclosed herein contemplates that the algae is living micro-algae and filamentous algae. The algae will provide a portion of the oxygen required by the bacteria thus reducing the energy required to treat the wastewater which also reduces the carbon footprint of the wastewater process. The algae will also capture and convert the $CO_2$ delivered to the system into additional algal mass thus increasing the biomass production potential of the system and preventing the release of the $CO_2$ as a greenhouse gas to the atmosphere. The algae will also convert ammonia directly into additional algal mass thus increasing the biomass production potential of the system and preventing nitrifying bacteria (inherent in typical wastewater) from creating $N_2O$ gas from the ammonia. The bacteria is living phototrophic and non-phototrophic bacteria. The bacteria convert the organic carbon (BOD) in the wastewater into inorganic carbon ($CO_2$) that is utilized by the algae growing in the system.

In certain aspect of the invention, the step of separating the algae and bacteria is conducted in a gravity clarifier. The step of dewatering the algae and bacteria may be accomplished with a centrifuge or belt press, while the drying step may be achieved by a solar or thermal sludge drying system.

The present invention contemplates that the biomass created is a valuable bi-product of the process that can be used to create the power to run the process itself. The biomass bi-product may also be used for purposes outside the wastewater treatment process, such as for production of electricity, biofuels, and other valuable products.

In a further aspect of the invention, a self-sustaining multifunctional wastewater treatment, greenhouse gas abatement, $CO_2$ capture, biomass production, and power plant facility comprises a mechanical screen, primary clarifiers, primary stage media wheels, secondary clarifiers, secondary stage media wheels, tertiary clarifiers, disinfection, flow metering, post aeration, biomass blending tank, biomass dewatering system, biomass drying system, biomass thermal processing system, and electrical generator system. The primary stage media wheels and secondary stage media wheels are each housed within a greenhouse which allows the capture of heat and $CO_2$ from the biomass thermal process for optimum algae and bacterial growth year round, even in cold climates.

According to one features, the primary stage media wheels and secondary stage media wheels are identical in construction and operation but located within the facility at separate stages in the process. The primary stage media wheels and secondary stage media wheels include an array of multiple media wheels arranged in trains of nine wheels in series that operate in plug flow fashion with multiple rows of media wheels parallel to each other. The number of rows needed is a function of the quantity of wastewater to be treated and/or $CO_2$ capture desired and/or biomass production desired. In one feature, the media wheels are supported by a plastic grid network that supports and allows the media wheels to rotate and that creates individual chambers for each wheel to provide a plug flow pattern through each nine wheel train. The grid system includes holes in the walls between each media wheel chamber in each flow train that allow the wastewater, algae, and bacteria to travel from media wheel to media wheel and finally over an exit water control weir to a common effluent channel.

In one feature, influent wastewater is evenly distributed to the rows of media wheels by utilizing a common influent channel bordering the media wheel tank and a common adjustable v-notch weir attached at the upper edge of the influent channel wall in front of the grid system. A series of v-notches along the weir are configured to control and distribute the wastewater evenly to the media wheel grid system. The water level maintained in the media wheel grid system is controlled by utilizing a common effluent channel bordering the media wheel tank and common adjustable effluent v-notch weir attached at the upper edge of the effluent channel wall at the end of the grid system.

The grid system disclosed herein also incorporates an air piping distribution system with air pipes running down each train of nine media wheels. An orifice opening in the piping is located under each media wheel in the correct location to allow the air to be captured in the media wheel fins. The raising and lowering of the water level in each media wheel chamber caused by the internal bio-media alternately moving into and out of the water allows an even air split across the entire working media wheel grid without the need for air control valves. Air blowers deliver the required air flow to rotate the media wheels through the air piping network included in the grid system. These blowers also provide the means to deliver additional $CO_2$ from the thermal process or from a source outside the facility to the algae.

In accordance with further aspect of the self-sustaining facility, the biomass is removed from the clarifiers, dewatered, and dried to create a usable biomass. The usable biomass may then be thermally processed to generate bio-oil, bio-gas, heat, $CO_2$, and ash. The resulting bio-oil may be used outside the facility, while the bio-gas may be combusted in a generator to produce electricity. A portion of the electricity is used to run the facility while surplus electricity is sent to the power grid. In accordance with one attribute of the system, the heat, $CO_2$, and ash created from the thermal process and the generation of electricity are delivered back to the primary stage media wheels and secondary stage media wheels for additional algae production, to optimize the operating parameters of the wastewater treatment process, and to capture the $CO_2$ from these external processes.

The multi-functional facility may further comprises an additional multi-functional facility to receive effluent from the primary media wheel system and recycled output from the separate facility when the capacity of the first multi-functional facility to use the recycled output is exceeded. Additional treatment facilities may be added until the operation of the separate facility is optimized.

The present invention contemplates a wastewater treatment facility that is very useful when land space is limited. In particular, in this facility the primary media wheel system and secondary media wheel system may be constructed as a multi-level facility. Light fixtures are placed on the ceilings on each level except the top level to provide the necessary light for the algae and phototrophic bacteria. The light fixtures may be artificial light fixtures or fiber optic light fixtures. The media wheel systems may de constructed in the same manner as the single-level systems with appropriate pumps to deliver wastewater to the influent intakes at the various levels.

The drawings and specifications presented herein disclose certain embodiments of the invention, but it is to be understood that, within the spirit and scope of this invention, the invention and mechanical features thereof are susceptible of modifications, structural changes, use of alternate devices as components of the whole apparatus, and various applications or uses of the whole or sub-combinations of said apparatus. Accordingly, applicant does not intend to limit the invention to the specific form disclosed but intends to cover all modifications, changes, sub-combinations, alternate constructions and methods falling within the scope of the principles taught herein, and as specified in the claims.

What is claimed is:

1. A wastewater treatment facility comprising:
   an inlet flow path for receiving wastewater from a source;
   a primary treatment system including;
      a first tank for containing wastewater received through said inlet flow path;
      a plurality of rotating media wheels mounted in said first tank for rotation within the wastewater and each containing a bacterial colony capable of digesting organic carbon in the wastewater and respiring $CO_2$, and each media wheel including surfaces for supporting algal growth, said surfaces arranged to be alternately immersed in the wastewater and exposed to sunlight;
      an air supply disposed within said first tank and having a plurality of outlets directed at a corresponding one of said plurality of media wheels to rotate said wheels within the wastewater and operable to aerate the wastewater; and
      a primary outlet for discharge of effluent treated by said primary treatment system after contact with the bacteria and algae;
   a secondary treatment system including;
      a second tank for receiving the effluent discharged from said primary outlet of said primary treatment system;
      a plurality of media wheels, each configured substantially identical to said media wheels in said primary treatment system;

an air supply disposed within said second tank and configured substantially identical to said air supply of said primary treatment system; and a secondary outlet for discharge of effluent treated by said secondary treatment system after contact with the bacteria and algae.

2. The wastewater treatment facility of claim 1, wherein said primary treatment system includes a primary clarifier disposed between said inlet flow path and said first tank, said primary clarifier operable to remove biosolids from the wastewater.

3. The wastewater treatment facility of claim 2, wherein said secondary treatment system includes a secondary clarifier disposed between said primary outlet and said second tank, said secondary clarifier operable to remove biosolids from the effluent from said primary treatment system.

4. The wastewater treatment facility of claim 3, wherein said secondary treatment system includes a tertiary clarifier at said second outlet to treat the effluent from said secondary treatment system, said tertiary clarifier operable to remove biosolids from the effluent from said secondary treatment system.

5. The wastewater treatment facility of claim 4, further comprising a disinfection unit downstream of said tertiary clarifier.

6. The wastewater treatment facility of claim 5, further comprising an aeration unit downstream of said disinfection unit.

7. The wastewater treatment facility of claim 4 further comprising a tank for receiving biomass extracted by said primary, secondary and tertiary clarifiers.

8. The wastewater treatment facility of claim 1, wherein each of said media wheels defines an interior portion communicating with the wastewater within a corresponding one of said tanks, said interior portion containing non-phototropic bacteria.

9. The wastewater treatment facility of claim 1, wherein said of said primary and secondary treatment systems includes a grid of interconnected panels defining a plurality of chambers within which a corresponding one of said media wheels is rotatably mounted.

10. The wastewater treatment facility of claim 9, wherein said grid defines a plurality of rows of chambers, adjacent chambers in each row in fluid communication to provide a plug flow pattern of wastewater through each row.

11. The wastewater treatment facility of claim 10, wherein each row of said grid defines nine chambers to rotatably receive a like number of said media wheels.

12. The wastewater treatment facility of claim 10, further comprising an air distribution grid associated with said grid of interconnected panels, said air distribution grid including a pipe associated with each of said rows, said pipe defining an air outlet opening at each of said chambers for directing air to rotate said media wheel associated with said chamber.

13. The wastewater treatment facility of claim 1, wherein said plurality of rotating media wheels in each of said primary and secondary treatment systems is provided in rows of nine media wheels.

14. The wastewater treatment facility of claim 1 wherein said primary and secondary treatment systems are housed within a greenhouse.

15. The wastewater treatment facility of claim 1, wherein said primary and secondary treatment systems are provided in a multi-level arrangement in which at least one tank of said systems is supported vertically above another tank of the systems.

16. The wastewater treatment facility of claim 15, wherein at least a lowermost one of said tanks is provided with a lighting system to provide light to said tank.

17. The wastewater treatment facility of claim 16, wherein said lighting system includes a collector for collecting sunlight, a light pipe for conveying the sunlight and an interior light fixture connected to said light pipe.

* * * * *